(12) United States Patent
Polomoff et al.

(10) Patent No.: US 11,650,381 B1
(45) Date of Patent: May 16, 2023

(54) PIC DIE AND PACKAGE WITH COVER FOR MULTIPLE LEVEL AND MULTIPLE DEPTH CONNECTIONS OF FIBERS TO ON-CHIP OPTICAL COMPONENTS

(71) Applicant: GlobalFoundries U.S. Inc., Malta, NY (US)

(72) Inventors: Nicholas A. Polomoff, Hopewell Junction, NY (US); Yusheng Bian, Ballston Lake, NY (US); Thomas Houghton, Marlboro, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 17/650,845

(22) Filed: Feb. 12, 2022

(51) Int. Cl.
*G02B 6/42* (2006.01)
*G02B 6/30* (2006.01)

(52) U.S. Cl.
CPC ............ *G02B 6/4243* (2013.01); *G02B 6/30* (2013.01); *G02B 6/423* (2013.01)

(58) Field of Classification Search
None
See application file for complete search history.

(56) References Cited

U.S. PATENT DOCUMENTS

| | | | |
|---|---|---|---|
| 5,534,442 A | * | 7/1996 | Parker .................. G02B 6/4249 257/E25.032 |
| 5,611,014 A | * | 3/1997 | Basavanhally .......... G02B 6/30 385/83 |
| 6,097,871 A | * | 8/2000 | De Dobbelaere ...... G02B 6/136 385/132 |
| 6,215,946 B1 | | 4/2001 | Sherrer |
| 6,411,752 B1 | | 6/2002 | Little et al. |
| 6,627,096 B2 | | 9/2003 | Sherrer et al. |
| 6,760,520 B1 | | 7/2004 | Medin et al. |
| 6,785,447 B2 | | 8/2004 | Yoshimura et al. |

(Continued)

FOREIGN PATENT DOCUMENTS

WO 02/41507 A2 5/2002

OTHER PUBLICATIONS

Boyer et al., "Novel, high-throughput, fiber-to-chip assembly employing only off-the-shelf components," 2017 IEEE 67th Electronic Components and Technology Conference, 2377-5726/17, pp. 1632-1639, 2017 IEEE, 8 pages.

(Continued)

*Primary Examiner* — Jerry Rahll
(74) *Attorney, Agent, or Firm* — Anthony Canale; Hoffman Warnick LLC

(57) ABSTRACT

PIC die packages may include a PIC die including: a body having a plurality of layers including a plurality of interconnect layers. A first optical fiber is positioned in a groove and a second optical fiber positioned in another groove in the edge of the body. The first optical fiber is aligned with an optical component in a first layer of the body at a first vertical depth, and the second optical fiber is aligned with another optical component in a second, different layer of the body at a second different vertical depth. A cover is over at least a portion of the body. The cover includes a member having a face defining a first seat therein having a first height to receive a portion of the first optical fiber, and defining a second seat therein having a second, different height to receive a portion of the second optical fiber.

20 Claims, 20 Drawing Sheets

(56) References Cited

U.S. PATENT DOCUMENTS

| | | |
|---|---|---|
| 6,817,776 B2 | 11/2004 | Colgan et al. |
| 6,839,476 B2 | 1/2005 | Kim et al. |
| 6,845,184 B1 | 1/2005 | Yoshimura et al. |
| 6,879,757 B1 | 4/2005 | Zhou et al. |
| 6,888,989 B1 | 5/2005 | Zhou et al. |
| 6,950,583 B2 | 9/2005 | Matsumoto et al. |
| 7,200,295 B2 | 4/2007 | Rolston et al. |
| 7,603,021 B2 | 10/2009 | Watanabe |
| 7,869,671 B2 | 1/2011 | Ishida et al. |
| 8,002,477 B2 | 8/2011 | Colgan et al. |
| 8,373,259 B2 | 2/2013 | Kim et al. |
| 8,538,208 B2 | 9/2013 | Ho et al. |
| 8,615,145 B2 | 12/2013 | Griebenow et al. |
| 8,768,123 B2 | 7/2014 | Yao et al. |
| 9,417,392 B2 | 8/2016 | Sugama et al. |
| 9,423,561 B1 | 8/2016 | Chou et al. |
| 9,563,018 B2 | 2/2017 | Budd |
| 9,606,291 B2 | 3/2017 | Ellis-Monaghan et al. |
| 9,696,504 B2 | 7/2017 | Aoki et al. |
| 9,869,815 B2 | 1/2018 | Ono et al. |
| 10,209,466 B2 | 2/2019 | Seidemann et al. |
| 10,224,286 B1 * | 3/2019 | England ............... H01L 25/167 |
| 10,527,790 B2 | 1/2020 | Potluri et al. |
| 10,598,860 B2 | 3/2020 | Ramachandran et al. |
| 10,816,726 B1 * | 10/2020 | Peng ................... G02B 6/3636 |
| 2003/0019838 A1 | 1/2003 | Shaw et al. |
| 2004/0081403 A1 * | 4/2004 | Kim ........................ G02B 6/30 |
| | | 385/52 |
| 2005/0129380 A1 * | 6/2005 | Takeuchi ............ C03C 10/0027 |
| | | 385/137 |
| 2018/0239095 A1 * | 8/2018 | Wade ................. H01L 29/0649 |
| 2018/0267255 A1 * | 9/2018 | Butler ................. G02B 6/3885 |
| 2020/0088946 A1 | 3/2020 | Webster et al. |
| 2020/0264390 A1 | 8/2020 | Wade et al. |
| 2020/0379172 A1 | 12/2020 | Watts et al. |
| 2021/0373245 A1 * | 12/2021 | Butler ................. G02B 6/3636 |
| 2022/0043208 A1 * | 2/2022 | Hsia ..................... G02B 6/4242 |
| 2022/0196918 A1 * | 6/2022 | Lin ......................... G02B 6/305 |
| 2022/0381985 A1 * | 12/2022 | Hsia ..................... G02B 6/124 |
| 2022/0404555 A1 * | 12/2022 | Brusberg ............. G02B 6/3664 |

OTHER PUBLICATIONS

Giewont et al., "300-mm Monolithic Silicon Photonics Foundry Technology," IEEE Journal of Selected Topics in Quantum Electronics, 25:8200611, Sep./Oct. 2019, 12 pages.

Peng et al., "A CMOS Compatible Monolithic Fiber Attach Solution with Reliable Performance and Self-alignment," Th3l.4.pdf, IEEE Xplore, OFC 2020, 3 pages.

Rakowski et al., "45nm CMOS—Silicon Photonics Monolithic Technology (45CLO) for next-generation, low power and high speed optical interconnects," T3H.3.pdf, IEEE Xplore, OFC 2020, 3 pages.

* cited by examiner

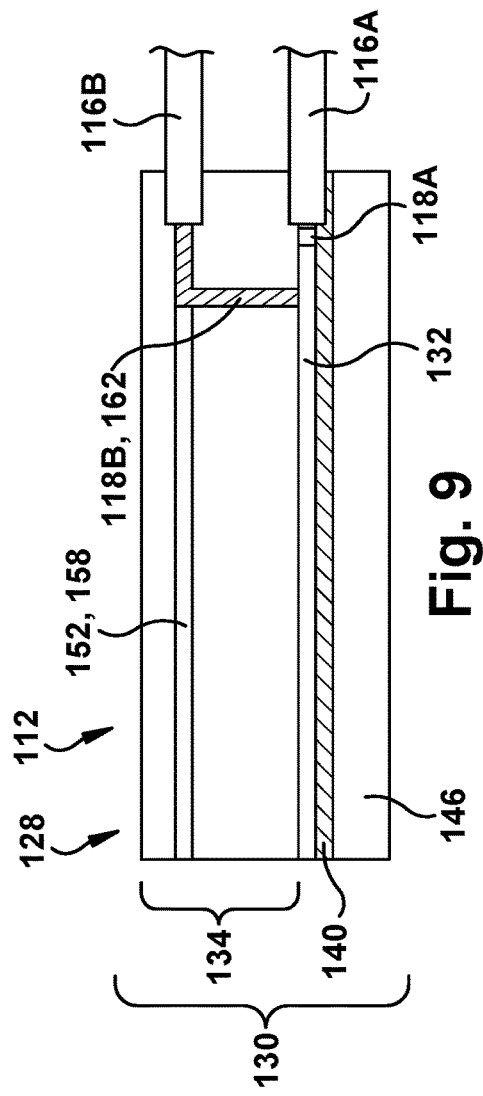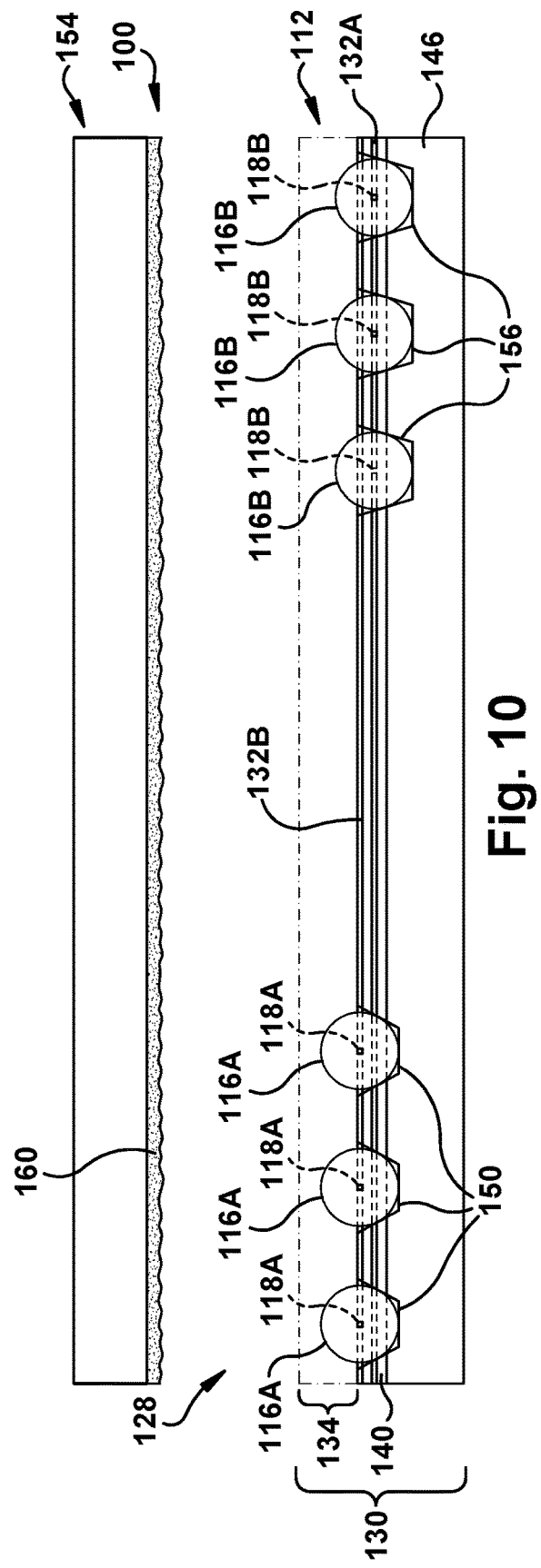

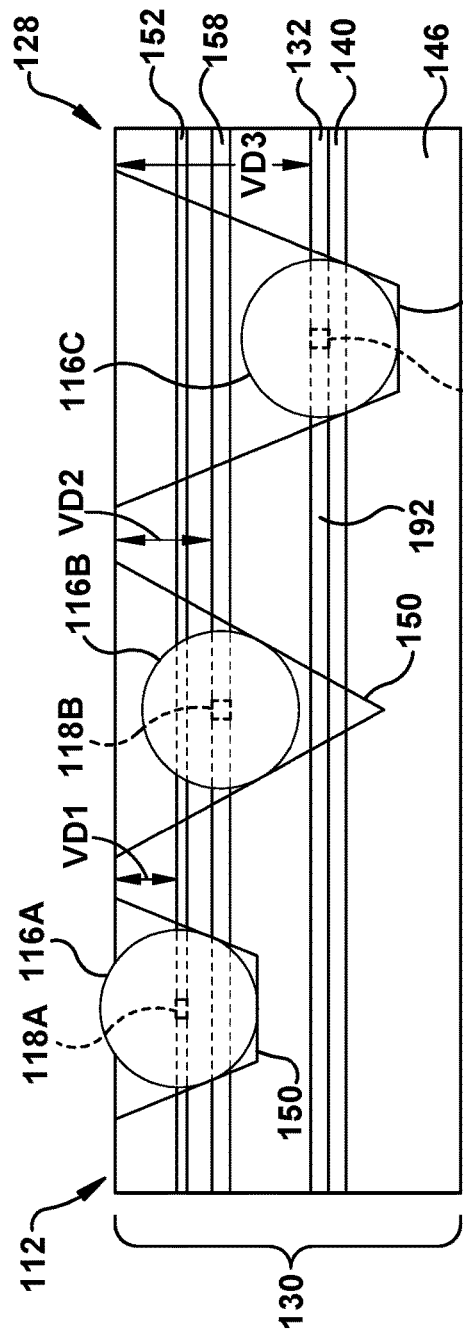
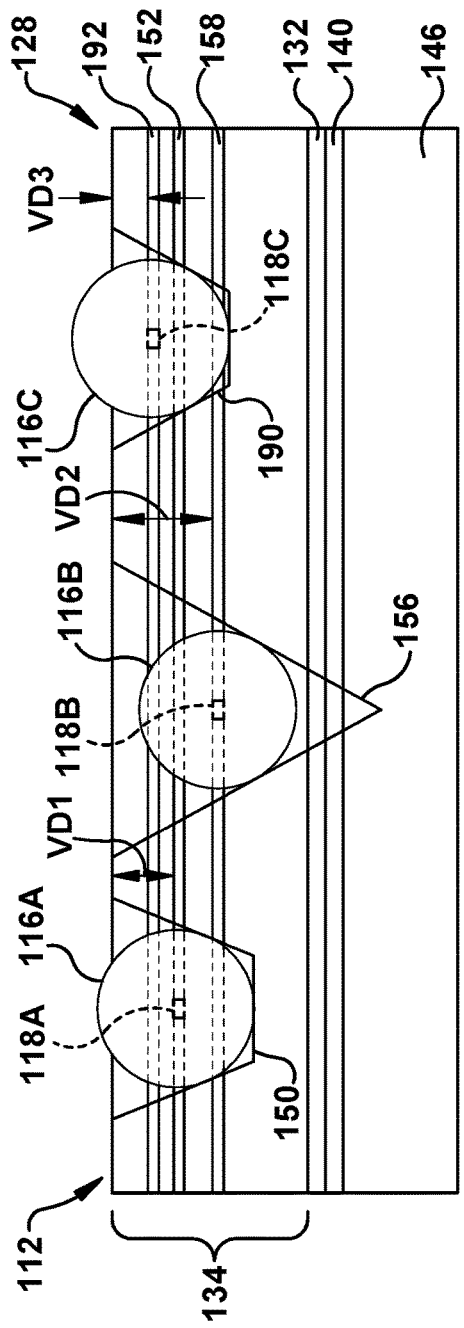
Fig. 14
Fig. 15

PIC DIE AND PACKAGE WITH COVER FOR MULTIPLE LEVEL AND MULTIPLE DEPTH CONNECTIONS OF FIBERS TO ON-CHIP OPTICAL COMPONENTS

BACKGROUND

The present disclosure relates to photonic integrated circuits (PICs), and more specifically, to a PIC die package with a cover for multiple depth (vertical and/or lateral) optical connect grooves for connection of cores of external optical fibers to on-chip optical components at multiple levels in the PIC die.

Current photonic integrated circuit (PIC) dies require complex packaging integration schemes. One challenge is optical coupling the PIC die to external optical fibers. For example, very precise alignment tolerances must be observed when attaching input and output fibers to efficiently couple light between the on-chip optical waveguides and external, off-module connections. Typically, a V-shaped or U-shaped optical connect groove is formed in an edge of the PIC die to seat an optical fiber in an aligned manner to a respective on-chip optical waveguide in the PIC die. A challenge with this arrangement is the on-chip optical waveguides are formed in or near the active layer of the PIC, i.e., with active devices such as transistors therein. Consequently, all the lateral optical connect grooves for connecting external optical fibers to the PIC die are also formed adjacent the active layer of the PIC. The grooves occupy a significant fraction of the PIC footprint that could otherwise be used for the active devices of the photonic device. This arrangement also limits the ability to increase data transmission in terms of rate (bandwidth) and density into the PIC because too many optical fibers in close, laterally adjacent proximity creates cross-talk between the optical signals. In another approach, one optical fiber may connect to several vertically spaced optical waveguides, i.e., a net of waveguides, that all connect together inside the PIC. Since only one optical fiber is provided, this approach does not increase data transmission rate (bandwidth) or density into the PIC.

SUMMARY

An aspect of the disclosure is directed to a photonic integrated circuit (PIC) die, comprising: a body having a plurality of layers including a plurality of interconnect layers; and a set of optical connect grooves defined in an edge of the body, the set of optical connect grooves including: a first groove aligning a core of a first optical fiber positioned therein with a first optical component in a first layer at a first vertical depth in the plurality of layers; and a second groove aligning a core of a second optical fiber positioned therein with a second optical component in a second, different layer at a second different vertical depth than the first vertical depth of the plurality of layers.

Another aspect of the disclosure includes a photonic integrate circuit (PIC) die, comprising: a body having a plurality of layers including a plurality of interconnect layers; and a set of optical connect grooves defined in an edge of the body, the set of optical connect grooves including: a first groove aligning a core of a first optical fiber positioned therein with a first optical component in the plurality of layers, the first groove having a first end face exposing the first optical component at a first lateral depth from an edge of the body, and a second groove aligning a core of a second optical fiber positioned therein with a second optical component in the plurality of layers, the second groove having a second end face exposing the second optical component at a second, different lateral depth from the edge of the body than the first lateral depth.

An aspect of the disclosure related to a method, comprising: forming a first groove defined in an edge of a body of a photonic integrated circuit (PIC) die, the first groove exposing a first optical component in a first layer at a first vertical depth in a plurality of layers of the body; and forming a second groove defined in the edge of the body, the second groove exposing a second optical component in a second, different layer at a second, different vertical depth in the plurality of layers of the body.

Another aspect relates to a photonic integrated circuit (PIC) die package, comprising: a PIC die including: a body having a plurality of layers including a plurality of interconnect layers; a first optical fiber positioned in a first groove in an edge of the body, the first optical fiber aligned with a first optical component in a first layer of the body at a first vertical depth in the plurality of layers; and a second optical fiber positioned in a second groove in the edge of the body, the second optical fiber aligned with a second optical component in a second, different layer of the body at a second different vertical depth than the first vertical depth of the plurality of layers; and a cover over at least a portion of the body, the cover including a first member having a first face defining a first seat therein having a first height to receive a portion of the first optical fiber and defining a second seat therein having a second, different height than the first height to receive a portion of the second optical fiber.

An aspect of the disclosure includes a photonic integrate circuit (PIC) die package, comprising: a PIC die including: a body having a plurality of layers including a plurality of interconnect layers; and a first optical fiber positioned in a first groove in an edge of the body, the first groove aligning a core of the first optical fiber with a first optical component in the plurality of layers, the first groove having a first end face exposing the first optical component at a first lateral depth from an edge of the body, and a second optical fiber positioned in a second groove in the edge of the body, the second groove aligning a core of the second optical fiber with a second optical component in the plurality of layers, the second groove having a second end face exposing the second optical component at a second, different lateral depth from the edge of the body than the first lateral depth; and a cover over at least a portion of the PIC die, the cover including a first member having a first portion facing the plurality of layers adjacent the first end face and a second portion facing the plurality of layers adjacent the second end face.

Another aspect of the disclosure relates to a method, comprising: coupling a first optical fiber into a first groove defined in an edge of a body of a photonic integrated circuit (PIC) die, the first groove aligning a core of the first optical fiber with a first optical component in a first layer at a first vertical depth in a plurality of layers of the body; coupling a second optical fiber in a second groove defined in the edge of the body, the second groove aligning a core of the second optical fiber with a second optical component in a second, different layer at a second, different vertical depth in the plurality of layers of the body; and coupling a cover over at least a portion of the PIC die, the cover including a first member having a first face defining a first seat therein having a first height to receive a portion of the first optical fiber and defining a second seat therein having a second, different height than the first height to receive a portion of the second optical fiber.

The foregoing and other features of the disclosure will be apparent from the following more particular description of embodiments of the disclosure.

BRIEF DESCRIPTION OF THE DRAWINGS

The embodiments of this disclosure will be described in detail, with reference to the following figures, wherein like designations denote like elements, and wherein:

FIG. 9 shows a cross-sectional view of a PIC die and PIC package including a vertical optical waveguide, according to embodiments of the disclosure.

FIG. 10 shows a cross-sectional view of a PIC die with optical fibers attached in different optical connect grooves and arranged by vertical depth, according to embodiments of the disclosure.

FIG. 14 shows a cross-sectional view of a PIC die and PIC package with optical fibers attached by optical connect grooves such that cores thereof are at more than two different vertical depths, according to embodiments of the disclosure.

FIG. 15 shows a cross-sectional view of a PIC die and PIC package with optical fibers attached by optical connect grooves such that cores thereof are aligned with optical components in a plurality of interconnect layers at different vertical depths, according to embodiments of the disclosure.

Figure 1:
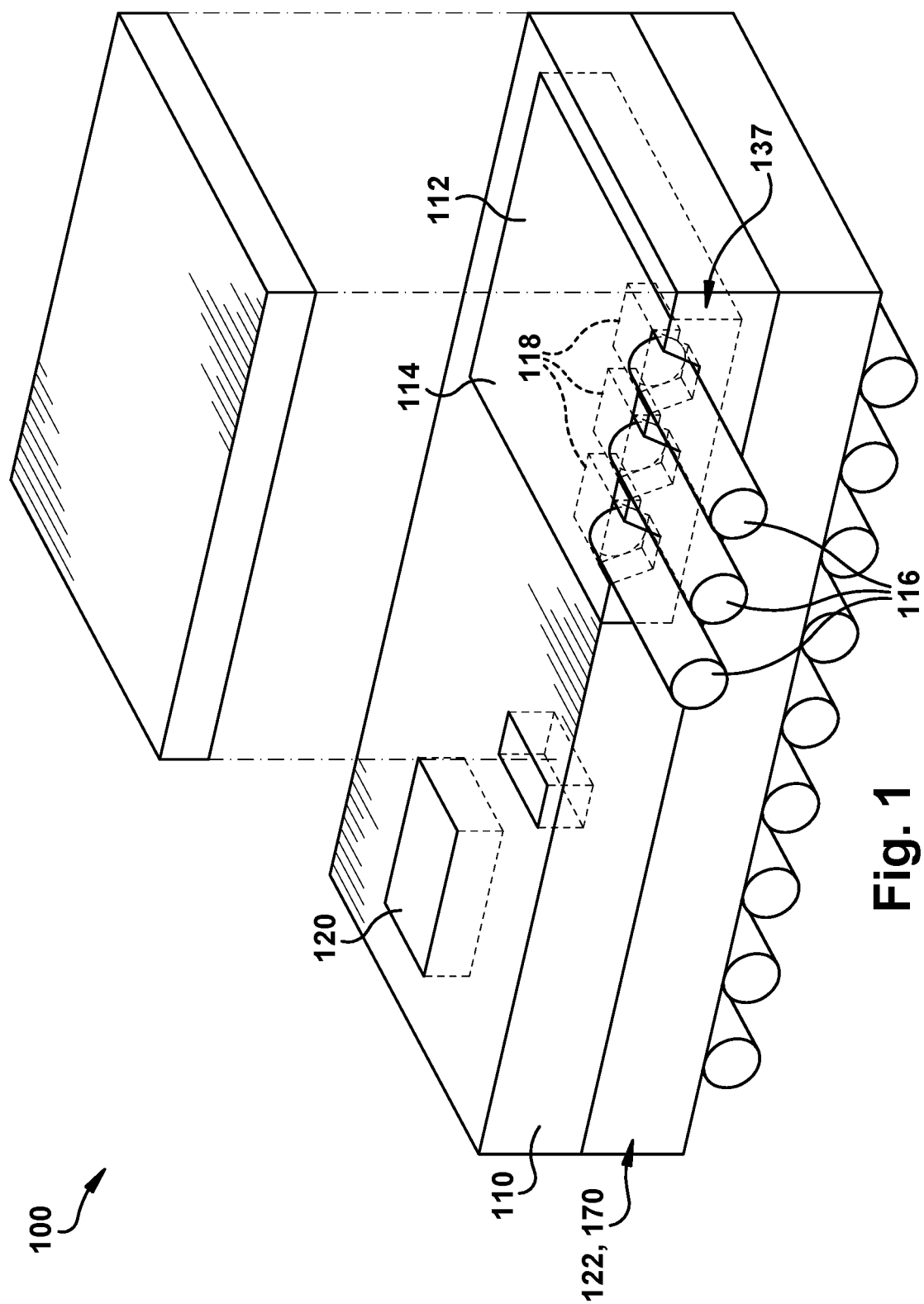
FIG. 1 shows an exploded perspective view of a PIC package, according to embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific illustrative embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

It will be understood that when an element such as a layer, region, or substrate is referred to as being "on" or "over" another element, it may be directly on the other element or intervening elements may also be present. In contrast, when an element is referred to as being "directly on" or "directly over" another element, there may be no intervening elements present. It will also be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

Reference in the specification to "one embodiment" or "an embodiment" of the present disclosure, as well as other variations thereof, means that a particular feature, structure, characteristic, and so forth described in connection with the embodiment is included in at least one embodiment of the present disclosure. Thus, the phrases "in one embodiment" or "in an embodiment," as well as any other variations appearing in various places throughout the specification are not necessarily all referring to the same embodiment. It is to be appreciated that the use of any of the following "/," "and/or," and "at least one of," for example, in the cases of "A/B," "A and/or B" and "at least one of A and B," is intended to encompass the selection of the first listed option (a) only, or the selection of the second listed option (B) only, or the selection of both options (A and B). As a further example, in the cases of "A, B, and/or C" and "at least one of A, B, and C," such phrasing is intended to encompass the first listed option (A) only, or the selection of the second listed option (B) only, or the selection of the third listed option (C) only, or the selection of the first and the second listed options (A and B), or the selection of the first and third listed options (A and C) only, or the selection of the second and third listed options (B and C) only, or the selection of all three options (A and B and C). This may be extended, as readily apparent by one of ordinary skill in the art, for as many items listed.

"Optical fiber" may include any now known or later developed single mode or multimode form of structure capable of communicating an optical signal from an external source to a photonic integrated circuit (PIC) die including but not limited to thin flexible fibers of glass, polymer or other transparent solids that can transmit optical (light-based) signals.

Embodiments of the disclosure provide a photonic integrated circuit (PIC) die and a related PIC package. The PIC die includes a body having a plurality of layers including a plurality of interconnect layers. The plurality of layers include(s) optical components to create a photonic integrated circuit (PIC). The PIC die also includes a set of optical connect grooves defined in an edge of the body of the PIC die, e.g., a lateral side and upper surface of the body. The set of optical connect grooves includes a first groove aligning a core of a first optical fiber positioned therein with a first optical component, such as an optical receiver, in a first layer at a first vertical depth in the plurality of layers, and a second groove aligning a core of a second optical fiber positioned therein with a second optical component at a second, different layer having a second different vertical depth than the first vertical depth in the plurality of layers. Alternatively, or in addition thereto, the grooves may have different lateral depths or distances from the edge of the body. In this regard, the first groove may have a first end face exposing the first optical component at a first lateral depth from the edge of the body, and the second groove has a second end face exposing the second optical component at a second, different lateral depth from the edge of the body than the first lateral depth. Any number of the first and second grooves can be used to communicate optical signal(s) to optical components in any number of layers and at any vertical and/or lateral depth within the PIC die. A PIC package may also include a cover over at least a portion of the PIC die. The cover may have seats with different heights and/or different lateral depths to accommodate the differently positioned optical fibers.

Embodiments of the PIC die and package provide optical signal alignment and communication to individual layers of interest and reduce signal losses and cross-talk. The PIC die also provides better use of discrete layers and individual layers, e.g., by freeing up areas of an active layer for other active layer devices rather than fiber attach structure. The PIC die can also provide higher data transmission rates and higher data transmission density in and out of individual layers, when compared to conventional PIC dies. The set of grooves provides flexibility to direct light to one or more active layers (front end of line FEOL) optical components, and/or to optical components in the back-end-of line (BEOL) and/or middle-of-line (MOL) interconnect layers. The set of grooves also provides flexibility to direct light to optical components located at different lateral depths from an edge of the body of the PIC die. Vertical waveguides may also be used to transmit the optical signal vertically between various layers.

Referring to FIG. 1, which shows an exploded, side top up perspective view of embodiments of a PIC package 100 (without a PCB attached thereto). PIC package 100 (also known as a PIC die fan-out package, and hereinafter "PIC package 100") may include an overmold body 110, and a PIC die 112 in overmold body 110. PIC die 112 may include any now known or later developed semiconductor photonic integrated circuitry therein. As understood in the art, PIC die 112, also known as an integrated optical circuit, can be any device that includes electro-optical circuitry 114 (or, PIC) that integrates multiple photonic functions for optical information signals received thereby via, e.g., optical fibers 116. Such functions oftentimes include converting the optical information signals to electrical signals or vice versa. Electro-optical circuitry 114 may include an (on-chip) optical component(s) 118 (FIG. 1, in dashed lines). Optical component(s) 118 may include, for example, a waveguide system (e.g., grating coupler, I/O waveguide), but may also include, depending on application, other components such as but not limited to: a Bragg reflector; an arrayed waveguide grating; transistor-based electronics including detectors and modulators; photodiodes; optical-to-electrical receiver (converter); optical amplifiers; a laser; a coupler and/or a modulator. It is understood that an optical waveguide system may include structures to guide light/signals from each optical fiber coupled thereto, individually.

Overmold body 110 may include any now known or later developed material capable of encapsulating electronic devices such as but not limited to thermoset polymers that come in, for example, epoxy molded compound resins, or silicone-based materials. PIC package 100 may also include an ancillary device 120 in overmold body 110. Ancillary device(s) 120 may include any one or more devices providing complementary functions to the PIC in PIC die 112. Any number of ancillary device(s) 120 may be provided. Ancillary device(s) 120 may include but are not limited to: a trans-impedance amplifier (TIA), a driver and/or a passive device (e.g., a resistor, capacitor, or other passive element). PIC package 100 also may include a redistribution wiring layer (RDL) interposer 122 adjacent overmold body 110 and electrically connected to PIC die 112 and ancillary device(s) 120. RDL interposer 122 may include any now known or later developed interconnect structure such as but not limited to wiring and vias within respective dielectric layers. Dielectric layers may include but are not limited to: polyimide (PI), polybenzaoxazole (PBO), benzocyclobutene (BCB), and epoxy based materials. Wiring and vias may include any now known or later developed materials such as copper or aluminum within a refractory metal liner. Other conventional PIC package structure may also be provided.

Figure 2:
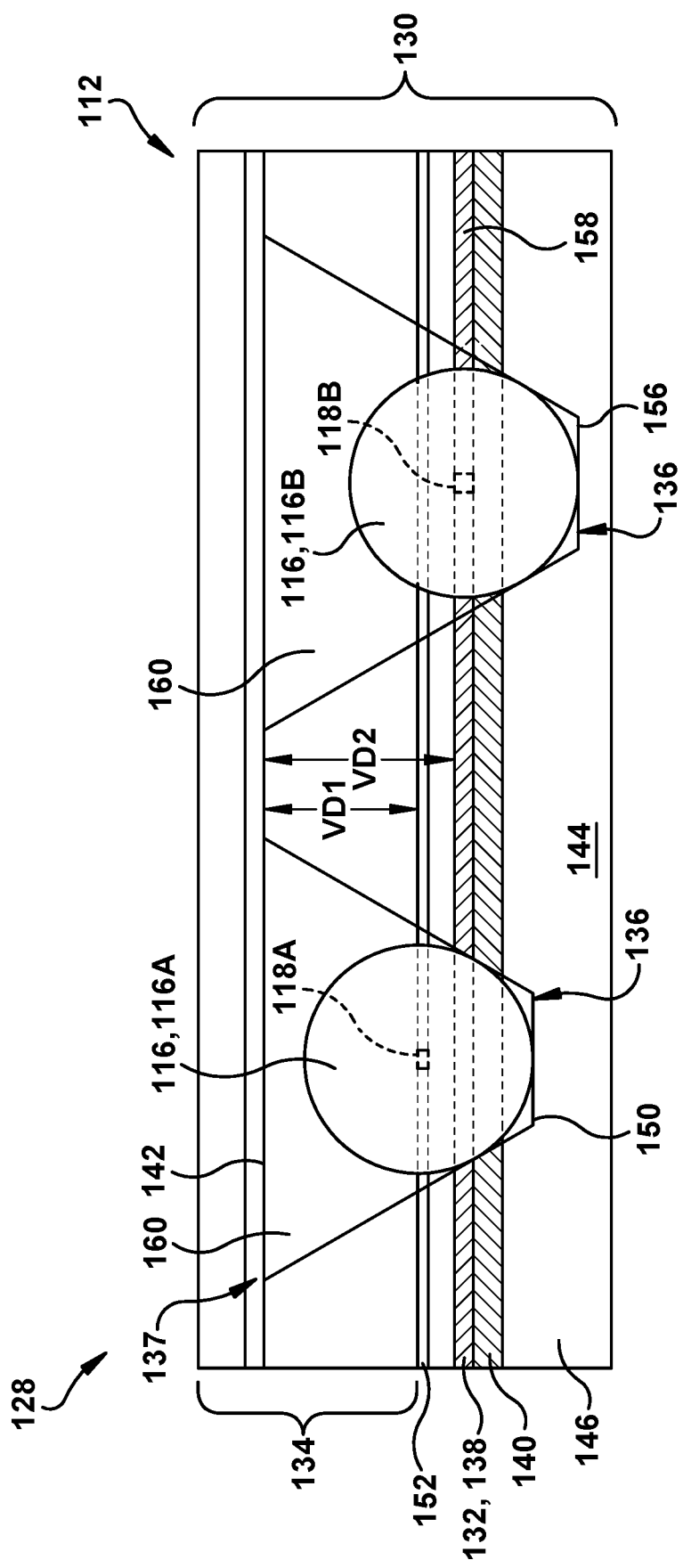
FIG. 2 shows a cross-sectional view of a PIC die with optical fibers attached in different optical connect grooves configured to position cores of the optical fibers at different vertical depths, according to embodiments of the disclosure.
Figure 3:
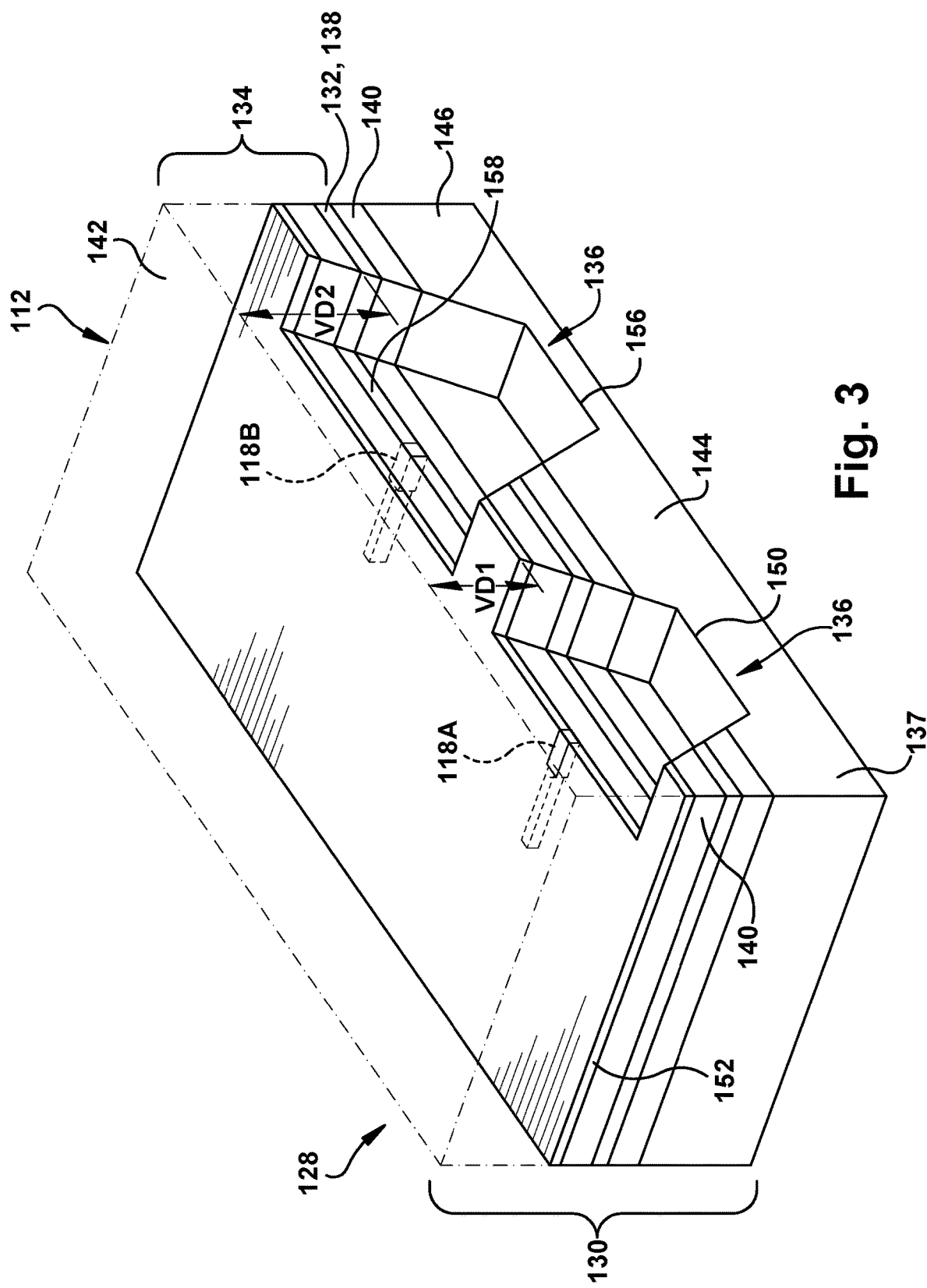
FIG. 3 shows a perspective view of a PIC die without the optical fibers attached, according to embodiments of the disclosure.
Figure 4:
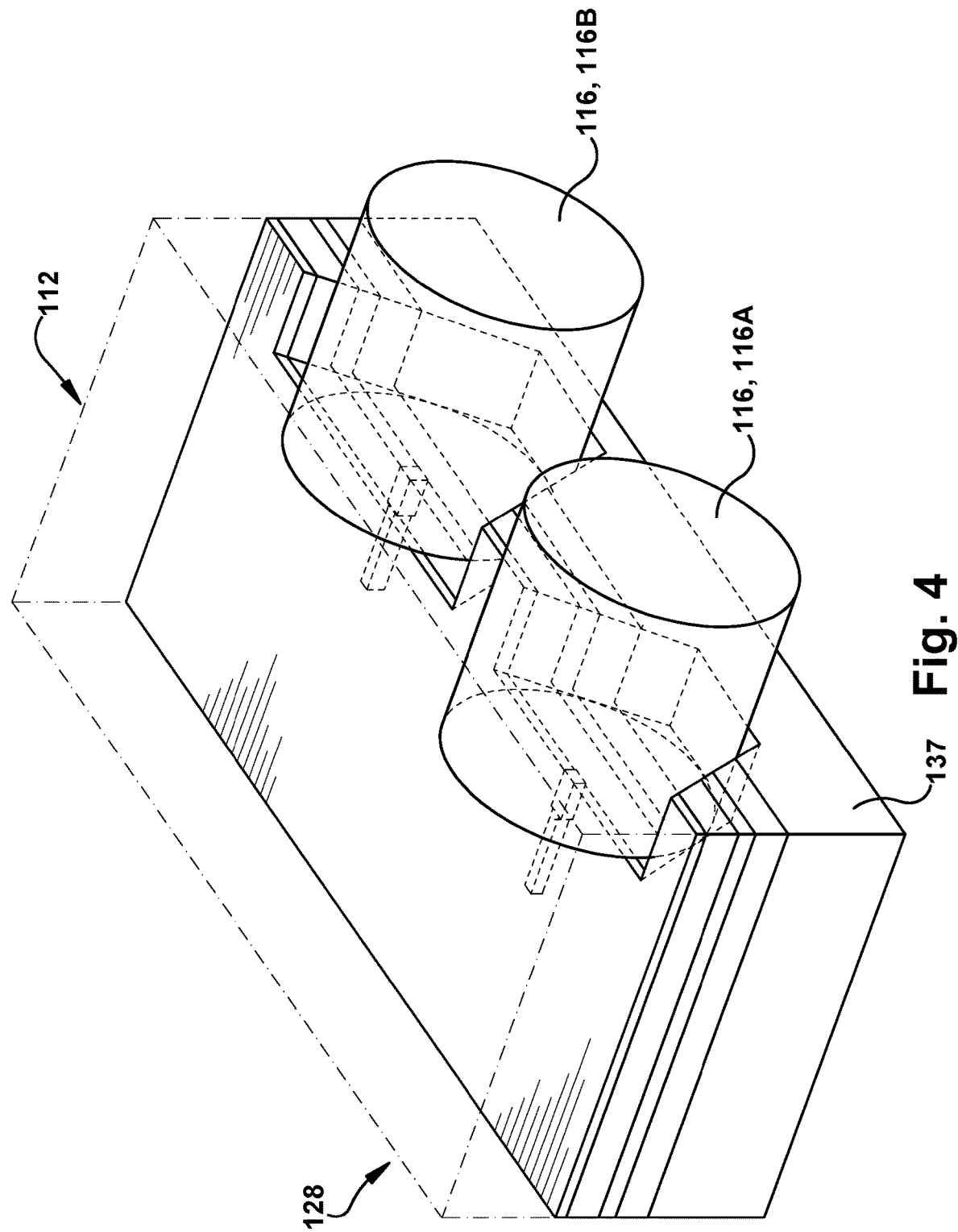
FIG. 4 shows a perspective view of a PIC die with optical fibers attached in optical connect grooves configured to position cores of the optical fibers at different vertical depths, according to embodiments of the disclosure.

PIC package 100 also includes plurality of optical fibers 116 operatively coupled to optical component(s) 118 (FIG. 1, in dashed lines) in PIC die 112. FIG. 2 shows a cross-sectional view of PIC die 112 and a number of optical fibers 116 attached thereto, FIG. 3 shows a perspective view of PIC die 112 without optical fibers, and FIG. 4 shows a perspective view of PIC die 112 with optical fibers 116, according to embodiments of the disclosure. PIC die 112 includes a body 128 having a plurality of layers 130 (FIGS. 2-3) including a plurality of interconnect layers 134 (FIGS. 2-3). Plurality of layers 130 may also include at least one active layer 132. In this latter case, plurality of interconnect layers 134 may be above active layer(s) 132. Plurality of layers 130 may also include a substrate 146. In the example shown, active layer(s) 132 may be part of a semiconductor-on-insulator (SOI) substrate including active layer(s) 132 in an SOI layer 138 over an insulator layer 140 over substrate 146. SOI layer 138 and substrate 146 may include any semiconductor material appropriate for PIC dies, e.g., silicon, silicon germanium, etc. Insulator layer 140 may include any appropriate dielectric appropriate for SOI substrates, e.g., silicon oxide. While an active layer 132 is shown as part of an SOI substrate, embodiments of the disclosure are not limited to any form of substrate.

Active layer(s) 132 may include any now known or later developed active devices (not shown) therein such as transistors, capacitors, resistors, and other forms of active devices, i.e., any front-end-of-line (FEOL) devices. Interconnect layers 134 may include any back-end-of-line (BEOL) or middle-of-line (MOL) interconnect layers. As understood in the art, interconnect layers 134 may include layers of dielectric material, such as silicon oxide, having laterally extending metal wires and/or vertical metal contacts (vias) therein for electrically connecting parts of PIC die 112 to form the PIC. Interconnect layers 134 may also include passive devices (not shown) such as resistors, capacitors, optical waveguides, etc.

PIC die 112 also includes a set of optical connect grooves 136 defined in an edge 137 of body 128 of PIC die 112. Edge 137 may include an outermost surface 142 of the die and/or a lateral side 144 of body 128. Lateral side 144 may include a side of the square or rectangle shaped PIC die 112 (and optionally overmold body 110 (FIG. 1)) that is not vertically facing, i.e., up or down, in an operative state. As understood in the art, optical connect grooves 136 act to position optical fibers 116, and more particularly, optical fiber stubs, relative to optical components 118 in body 128 of PIC die 112. More specifically, optical connect grooves 136 align cores of optical fibers 116, i.e., the center of the optical fibers that carry the optical signal, relative to optical components 118 in body 128 of PIC die 112. As shown in FIG. 2, set of optical connect grooves 136 includes a first groove 150 aligning a core of a first optical fiber 116A positioned therein with a first optical component 118A in a first layer 152 at a first vertical depth VD1 in plurality of layers 130. In contrast to conventional systems, set of optical connect grooves 136 also includes a second groove 156 aligning a core of a second optical fiber 116B positioned therein with a second optical component 118B in a second, different layer 158 at a second different vertical depth VD2 than first vertical depth VD1 (deeper as shown) in plurality of layers 130. As used herein, "align" means the core of the optical fiber can optically communicate with a respective optical component, i.e., the core is in line with the optical component. Vertical depths VD1, VD2 may be measured from any structure over grooves 150, 156, e.g., an outermost interconnect layer 134 forming outermost surface 142 of PIC die 112. As illustrated, grooves 150, 156 position the cores of optical fibers 116A, 116B such that the cores align with optical components 118A, 118B which are in different layers 152, 158 at different vertical depths within body 128 of PIC die 112. While optical fibers 116A, 116B are generally illustrated having the same size, e.g., diameter, it will be recognized that they may have different sizes. In any event, grooves 150, 156 will align the cores of the fibers at different layers having different vertical depths, relative to body 128.

First groove 150 and second groove 156 may be formed separately or together. In any event, a mask(s) (not shown) may be patterned over body 128 of PIC die 112 and an etch may be performed to open first groove 150 and/or second groove 156. Where formed separately, each etch may be configured to form the respective groove 150 or 156. Where grooves 150, 156 are formed together, parameters of the etch may be controlled to create the grooves to align the respective cores at different layers 152, 158 having different vertical depths VD1, VD2, and having different lateral depths LD1, LD2, etc. (see e.g., FIG. 3). For example, varied groove configurations in terms of, for example, shape, width, vertical depth, lateral depth from edge 137 of body 128, etc., can be formed using a single mask with varying aperture positions, sizes (e.g., widths and lengths) and/or shapes. The different aperture configurations when exposed to an etch (such as but not limited to a tetramethylammonium hydroxide (TMAH) based etch) process at the same time and under the same process conditions will result in the formation of cavities (grooves) having different configurations. In any event, first groove 150 may be formed having a configuration defined in edge 137 of body 128 of PIC die 112 to expose first optical component 118A in first layer 152. First groove 150 is configured to allow alignment of a core of an optical fiber 116 to be positioned therein with first layer 152 at first vertical depth VD1 in plurality of layers 130 of body 128 of PIC die 112. Further, second groove 156 may be formed having a configuration defined in edge 137 of body 128 of PIC die 112 to expose second optical component 118B in second, different layer 158. Second groove 156 is configured to allow alignment of a core of second optical fiber 116B to be positioned therein with second layer 158 at second vertical depth VD2 in plurality of layers 130. The etch may include any chemistry(ies) appropriate for the material layers to be removed, e.g., a wet etch, a dry etch, etc.

For illustrative purposes only, optical fibers 116, which may in certain situations be referred to as fiber stubs because of their short length, may have, for example, a nine micrometer (μm) core and a 125 μm outer diameter glass cladding. It is noted that these dimensions are possible dimensions of optical fibers 116 assuming PIC die 112 with a body 128 having one millimeter (mm) long grooves 150, 156. It is emphasized that dimensions may vary depending on, for example, the die size, groove 150, 156 length, the fiber length, fiber protruding length and other parameters. In other examples, optical fibers 116 may have an eighty μm diameter and a four μm core. Multimode fibers (125 μm fiber with 62.5 μm core) could also be coupled to grooves 150, 156. In any event, first and second optical connect grooves 150, 156 may have an appropriate vertical or lateral depth, width, and length to position the cores of the optical fibers appropriately to align with optical components 118 at different layers 152, 158 and at different vertical depths within PIC die 112. Optical fibers 116 may be held in grooves 150, 156 by any appropriate mechanism, e.g., adhesive 160 (see also FIG. 11).

Optical fibers 116 may be coupled into respective grooves 150, 156 using any now known or later developed technique such as but not limited using a pick-and-place system. In any event, first optical fiber 116A is coupled into first groove 150, which aligns a core of first optical fiber 116A with first optical component 118A in first layer 152 of plurality of layers 130 of body 128 of PIC die 112. Further, second optical fiber 116B is coupled in second groove 156, which aligns a core of second optical fiber 116B with second optical component 118B in second, different layer 158 of layers 130 of body 128 of PIC die 112.

Figure 5:
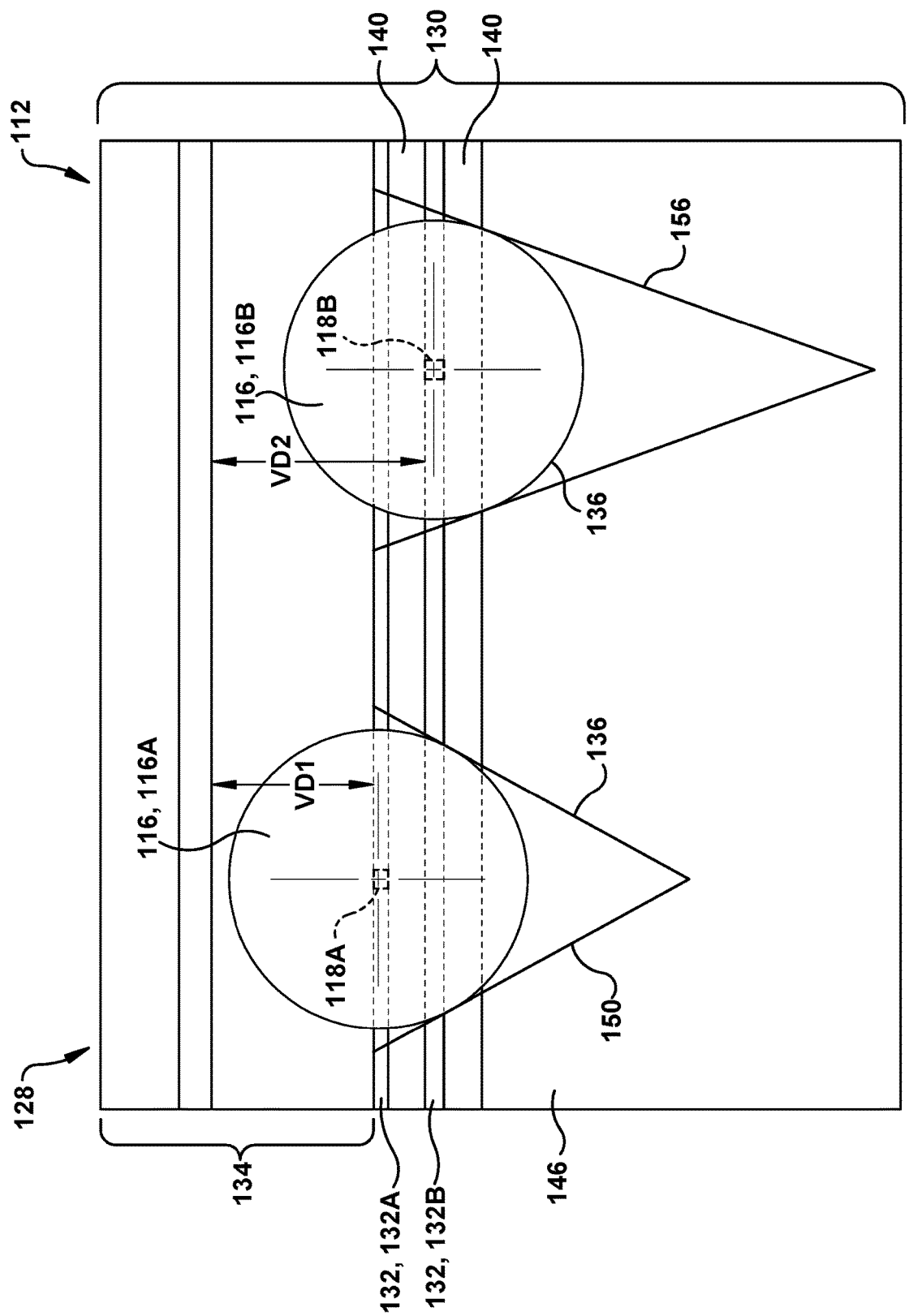
FIG. 5 shows a cross-sectional view of a PIC die with optical fibers attached in different optical connect grooves for two active layers at different vertical depths, according to embodiments of the disclosure.

In the example of FIGS. 2-4, first groove 150 aligns a core of first optical fiber 116A with first optical component 118A in one of the plurality of interconnect layers 134, i.e., layer 152, and second groove 156 aligns a core of second optical fiber 116B with second optical component 118B in active layer 132. Layer 152 may be any layer in interconnect layer 134, allowing optical fiber 116A to be moved vertically away from active layer 132, and perhaps allowing more area in active layer 132 to be used for active devices. The vertical spacing also reduces cross-talk between what would normally be laterally adjacent fibers. In the example shown in FIG. 2, a single active layer 132 is used. FIG. 5 shows a cross-sectional view in which plurality of layers 130 includes a first active layer 132A and a second, different active layer 132B under first active layer 132A. In the example shown, each active layer 132A, 132B is part of a respective SOI layer, each with a respective insulation layer 140. It is noted that other forms of dual active layer configurations are also possible. In these embodiments, first groove 150 aligns a core of first optical fiber 116A with first optical component 118A in first active layer 132A, and second groove 156 aligns a core of second optical fiber 116B with second optical component 118B in second active layer 132B. In this manner, different active layers 132A, 132B with different active devices may be supplied with different optical signals.

Figure 6:
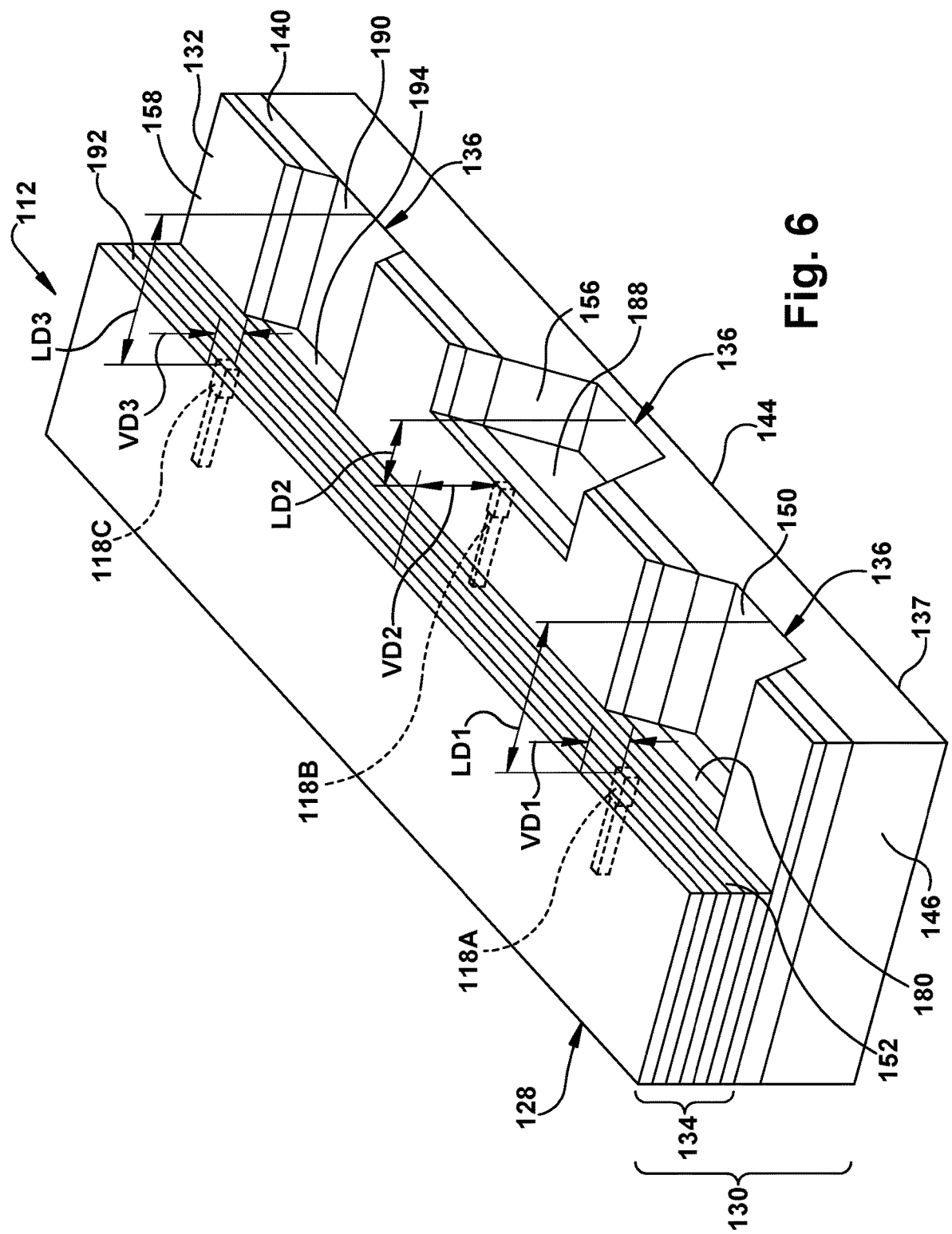
FIG. 6 shows a perspective view of a PIC die with a set of optical connect grooves configured to position cores of the optical fibers at different vertical depths and at different lateral depths from an edge of the body of the die, according to embodiments of the disclosure.
Figure 7:
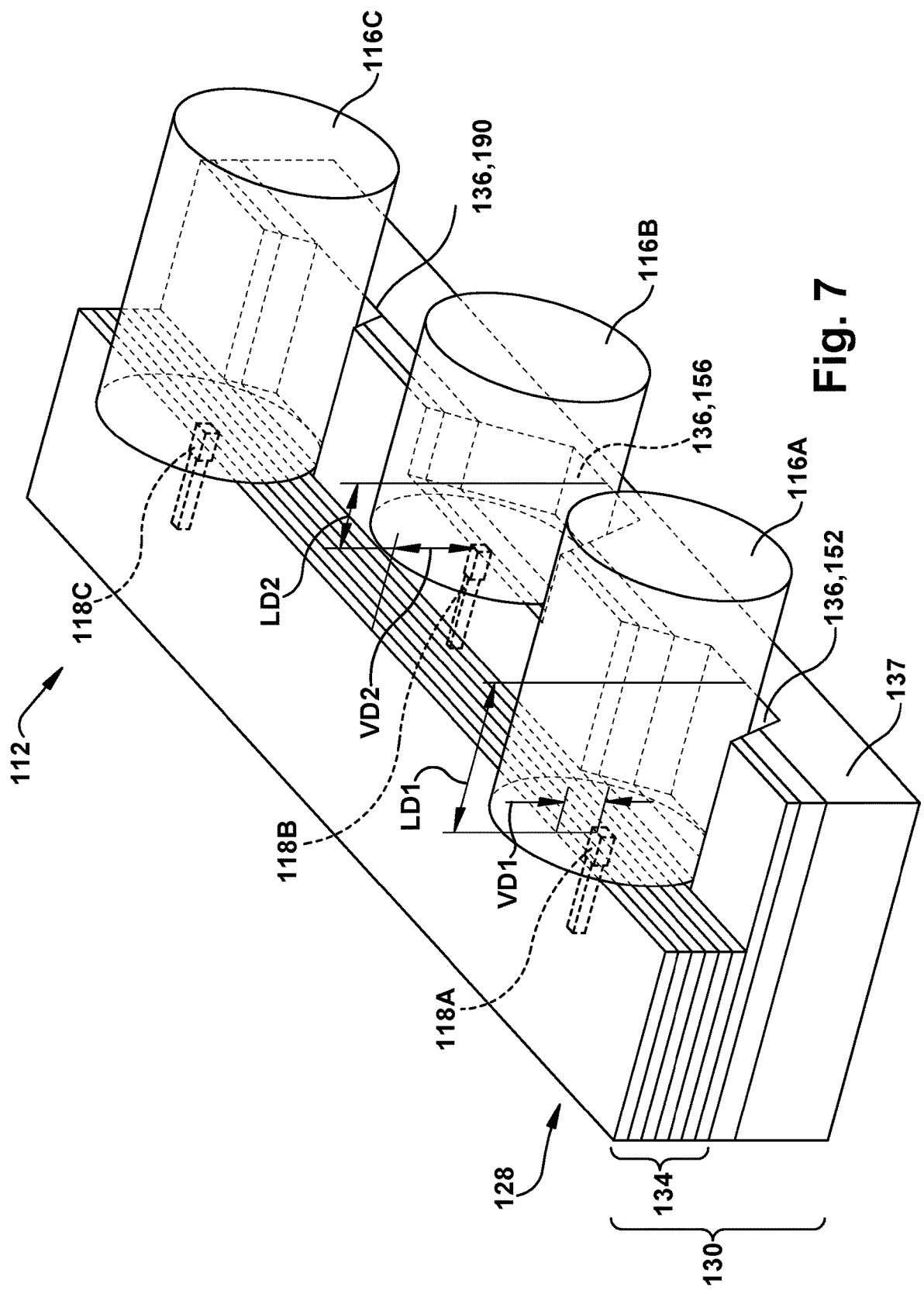
FIG. 7 shows a perspective view of a PIC die of FIG. 6 with optical fibers attached in the set optical of connect grooves, according to embodiments of the disclosure.

FIG. 6 shows a perspective view of a PIC die 112 with a set of optical connect grooves 136 configured to position cores 118A-C of optical fibers 116A-C at different vertical depths VD1-VD3 and at different lateral depths LD1-LD3 from edge 137 of body 128 of the die, according to embodiments of the disclosure. FIG. 7 shows a perspective view of PIC die 112 of FIG. 6 with optical fibers 116A-C attached in set optical connect grooves 136. Here, first groove 150 has a first end face 180 exposing first optical component 118A at a first lateral depth LD1 from edge 137 and, in particular, lateral side 144, of body 128. PIC die 100 also includes second groove 156 having a second end face 188 exposing second optical component 118B at a second, different lateral depth LD2 from edge 137 and, in particular, lateral side 144, of body 128 than first lateral depth LD1. Lateral depths LD1, LD2 may be measured from lateral side 144, of body 128. PIC die 100 may include any number of grooves 136 having different lateral depths from edge 137 of body 128. In FIG. 6, a third groove 190 having a third end face 194 exposing third optical component 118D at a third, different lateral depth LD3 from edge 137 of body 128 than first and second lateral depths LD1, LD2, is provided. The grooves having the structure shown in FIGS. 6 and 7 may be formed as previously described herein.

Figure 8:
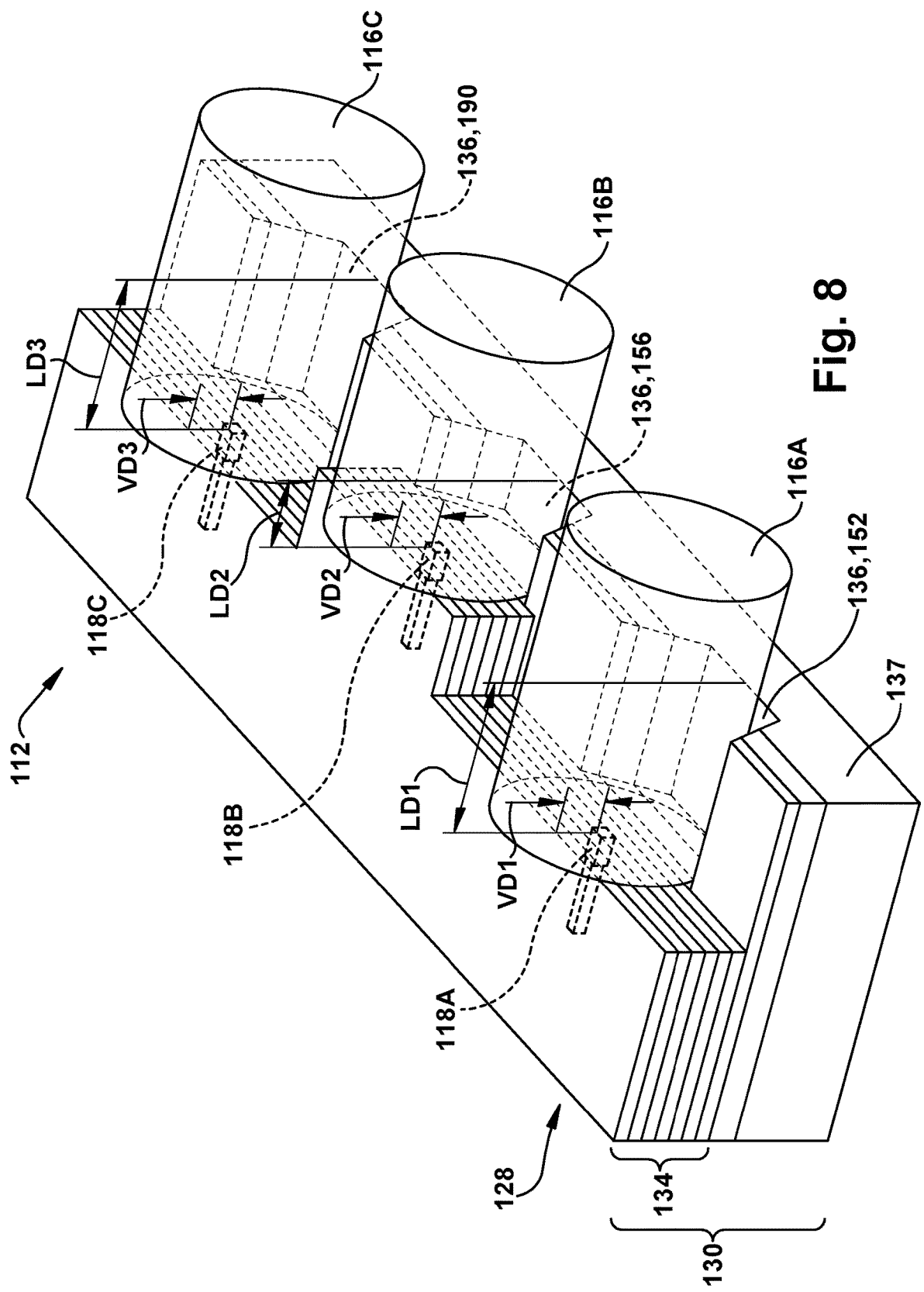
FIG. 8 shows a perspective view of a PIC die with a set of optical connect grooves configured to position cores of the optical fibers at different lateral depths from an edge of the body of the die, according to embodiments of the disclosure.

FIG. 8 shows a perspective view of a PIC die 100 with a set of optical connect grooves 136 configured to position cores of optical fibers 116A-C at different lateral depths LD1-LD3 from edge 137 of body 128 of the die. Here, the vertical depths of each optical component 118A-C, i.e., the layer in which located, are the same. Any number of grooves 136 with different lateral depths from edge 137 of body 128 can be used. The grooves having the structure shown in FIG. 8 may be formed as previously described herein.

FIG. 9 shows a cross-sectional view of a PIC die including an optical component 118B in the form of an optical waveguide 162 configured to deliver an optical signal vertically from at least one of first layer 152 and second layer 158 to, for example, active layer 132. Optical waveguide 162 may include any now known or later developed vertical optical tunnel capable of redirecting and transmitting an optical signal vertically through any layer(s) 130 of PIC die 112. While an example positioning is illustrated in FIG. 9, optical waveguide 162 may deliver an optical signal vertically between any layers 130 in body 128 of PIC die 112.

Where optical components 118 include optical waveguides, the waveguides can be made of different materials depending on the layer 130 in which they are located. For example, as shown in FIG. 2, optical component 118A in one of interconnect layer 152 may include a silicon nitride waveguide, while second optical component 118B in active layer 132 may include a silicon waveguide. In another example, as shown in FIG. 5, optical component 118A in first active layer 132A and second optical component 118B in second active layer 132B may both include a silicon waveguide.

Figure 11:
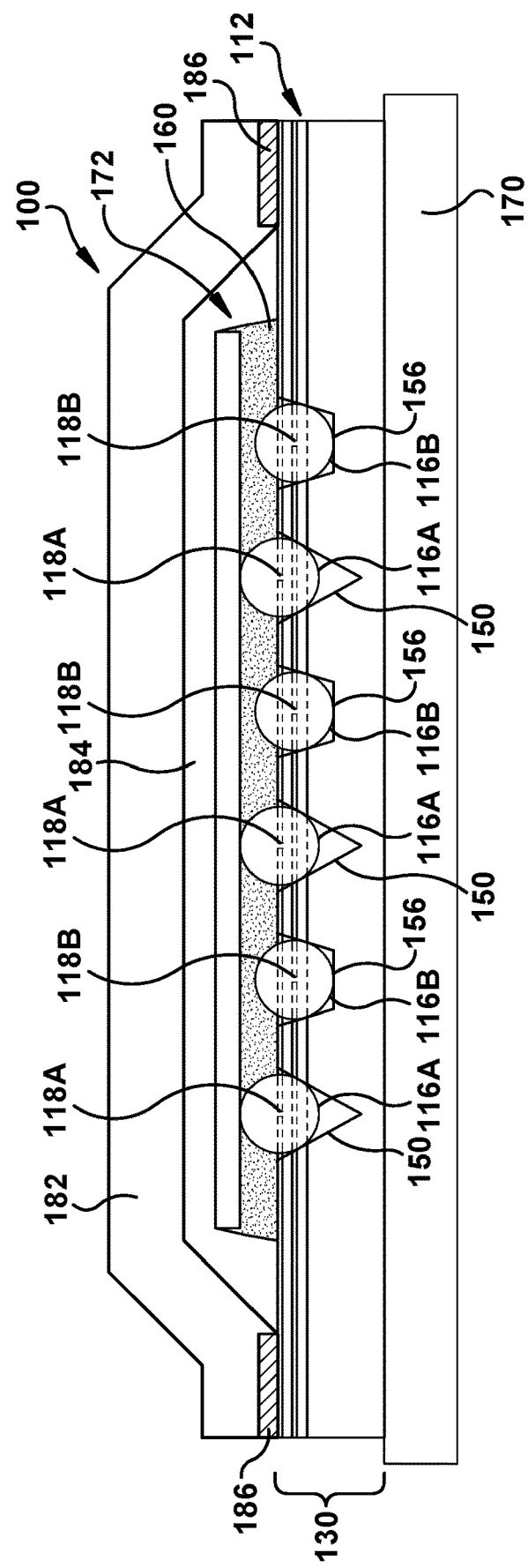
FIG. 11 shows a cross-sectional view of a PIC die and PIC package with a cover attached, according to embodiments of the disclosure.

FIGS. 10 and 11 show cross-sectional views of a PIC die 112 with more than one first groove 150 and more than one second groove 156. Regardless of embodiment, PIC die 112 may have any number of different optical connect grooves 150, 156. Grooves 150, 156 can be arranged in any desired manner. For example, in FIG. 10, first grooves 150 are together in one location on body 128, while second grooves 156 are together in another location on body 128. Hence, optical fibers 116 having cores at certain vertical depths and/or certain lateral depths can be located together. In this setting, a cover 154 (shown above PIC die 112) may be used as part of PIC package 100 to cover optical fibers 116A, 116B. Cover 154 also holds optical fibers 116A, 116B in place. In FIG. 11, first grooves 150 and second grooves 156 alternate in a lateral direction in body 128. Hence, optical fibers 116 having cores aligned at alternating vertical depths are possible. A similar arrangement can be provided relative to lateral depths.

With continuing reference to FIG. 11, PIC package 100 may include PIC die 112 on a packaging substrate 170, e.g., a printed circuit board, RDL interposer, etc. PIC package 100 may also include a cover 172 over at least a portion of PIC die 112. Cover 172 (and cover 154 in FIG. 10) may be coupled over at least a portion of PIC die 112, i.e., over optical fibers 116 and/or other parts of PIC die 112, for example, by adhesive 160. PIC package 100 may also include any now known or later developed lid 182 coupled to cover 172 (or cover 154 in FIG. 10) by, for example, a thermal paste 184, and/or coupled to PIC die 112 by any appropriate adhesive 186. Lid 182 may optionally include a heat sink (not shown).

Regardless of embodiment, optical connect grooves 150, 156 may have any now known or later developed configuration. In FIGS. 1-5, first and second grooves 150, 156 are referred to as V-grooves, meaning they have slanted sides which may be connected by a horizontal surface (see e.g., FIGS. 2-4) or may meet at a point (see e.g., FIG. 5). In other embodiments, shown for example in the cross-sectional view of FIG. 10, first and second grooves 150, 156 are referred to as U-grooves, meaning they have generally vertical sides with a curved bottom. First groove(s) 150 do not need to have the same configuration as second groove(s) 156, e.g., one can be a V-groove and the other a U-groove (see e.g., FIG. 10), or they may have the same shape but different vertical or lateral depths, widths, etc. The pitch (i.e., distance between adjacent grooves) between first grooves 150 and the pitch between second grooves 156 can also be customized. For example, first grooves 150 may have a pitch of 127 μm, while second grooves 156 may have a pitch of 150 μm, even though both grooves 150, 156 are on the same PIC die 112. In this manner, the spacing between grooves 150, 156 and hence the cores of optical fibers 116, and its effect on performance, e.g., cross-talk, can be controlled. Any pitch between any grooves can be used to provide the desired layout and performance for PIC die 112.

Figure 12:
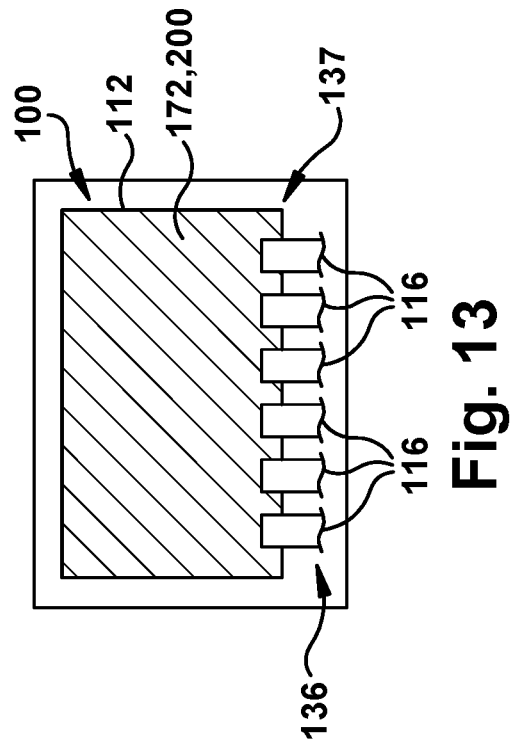
FIG. 12 shows a top down view of a PIC die and PIC package with a cover over a portion of the PIC die, according to embodiments of the disclosure.
Figure 13:
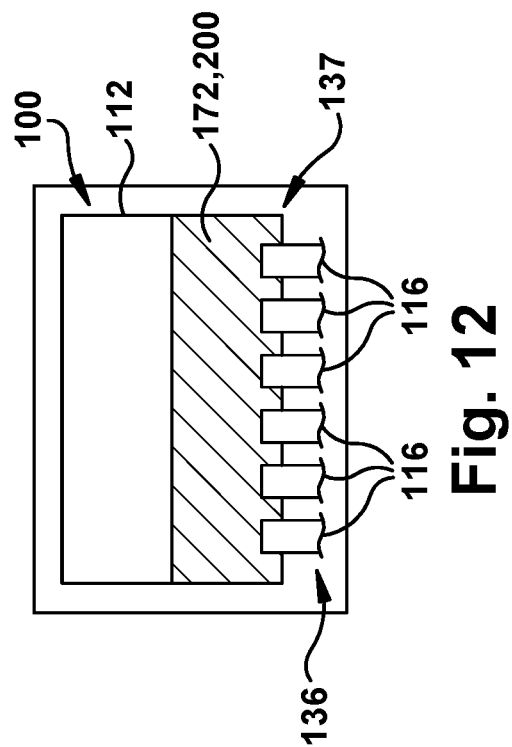
FIG. 13 shows a top down view of a PIC die and PIC package with a cover over an entirety of the PIC die, according to embodiments of the disclosure.

Covers 154 (FIG. 10) and 172 (FIG. 11) can cover any extent of PIC die 112 desired. FIGS. 12 and 13 show top down views of PIC package 100, according to embodiments of the disclosure. In FIG. 12, cover 172, for example, covers only a portion of PIC die 112 over set of optical connect grooves 136 in edge 137 of body 128 of PIC die 112. In FIG. 13, cover 172 covers an entirety of PIC die 112 including, among other parts, set of optical connect grooves 136 in edge 137 of body 128 of PIC die 112. These arrangements can also be applied to cover 154 (FIG. 10).

While embodiments of the disclosure have been described herein with first and second grooves 150, 156 for first and second optical fibers 116A, 116B and first and second optical components 118A, 118B, embodiments of the disclosure can include grooves that position cores of optical fibers at more than two different layers and vertical depths, and/or more than two different lateral depths. For example, as shown in FIG. 14, PIC die 112 may include a third groove 190 aligning a core of a third optical fiber 116C with a third optical component 118C in a third, different layer 192 at a third different vertical depth VD3 than first vertical depth VD1 and second vertical depth VD2 of first and second layers 152, 158, respectively. While shown as an active layer 132, third layer 192 can be any of layers 130. Any number of different grooves can be provided. For example, four, five, six or more different grooves are also possible and considered within the scope of the disclosure. While many embodiments of the disclosure illustrate optical components 118 in active layer(s) 132 (e.g., silicon waveguides) and interconnect layer(s) 152, 158 (e.g., silicon nitride waveguides) together, it will be recognized that the teachings of the disclosure may be applied to just active layers 132 (see, e.g., FIGS. 2 and 10) or just interconnect layers 134. FIG. 15 shows a cross-sectional view of die 112 including optical components 118 (e.g., silicon nitride waveguides) in interconnect layer(s) 134 (e.g., 152, 158, 192) only.

Referring again to FIGS. 10 and 11, one challenge with using a cover 154 or 172 that is planar on both faces thereof is the cover may not contact each optical fiber 116. Consequently, where adhesive 160 has insufficient strength and/or adherence, some optical fibers 116 may move relative to respective grooves 150, 156, e.g., vertically out from the grooves, possibly resulting mis-alignment of optical fibers 116 and optical components 118.

FIGS. 16-22 show various views of a cover 200 according to other embodiments of the disclosure. In these embodiments, PIC package 100 includes PIC die 112. PIC die 112 includes, as previously described, body 128 having plurality of layers 130 including plurality of interconnect layers 134. PIC die 112 also includes first optical fiber 116A positioned in first groove 150 in edge 137 of body 128. As shown in FIG. 3, first optical fiber 116A is aligned with first optical component 118A in first layer 152 of body 128 at first vertical depth VD1 in plurality of layers 130. PIC die 112 also includes second optical fiber 116B positioned in second groove 156 in edge 137 of body 128. Second optical fiber 116A is aligned with second optical component 118B in second, different layer 158 of body 128 at second different vertical depth VD2 than first vertical depth VD1 of plurality of layers 130. As noted relative to FIGS. 6 and 7, one (first) groove 150 may have first end face 180 exposing first optical component 118A at first lateral depth LD1 from edge 137 of body 128, and another (second) groove 156 may have second end face 188 exposing second optical component 118B at second, different lateral depth LD2 from edge 137 of body 128 than first lateral depth LD1.

A method may include, as previously described, coupling first optical fiber 116A into first groove 150 defined in edge 137 of body 128 of PIC die 112. First groove 150 aligns a core of first optical fiber 116A with first optical component 118A in first layer 152 at first vertical depth VD1 in plurality of layers 130 of body 128. The method may also include coupling second optical fiber 116B in second groove 156 defined in edge 137 of body 128. Second groove 156 aligns a core of second optical fiber 116B with second optical component 118B in second, different layer 158 at second, different vertical depth VD2 in plurality of layers 130 of body 128. Grooves 150, 156 can have different vertical and/or lateral depths. Any number of grooves and optical components 118 having different vertical and/or lateral depths are possible.

As shown in FIGS. 16-22, PIC package 100 also includes a cover 200 over at least a portion of body 128. In contrast to FIGS. 10 and 11, cover 200 does not include two planar faces. Rather, as shown in one embodiment in FIGS. 16-17, cover 200 includes a number of seats 210, 220 having different heights and/or lateral extents. Seats 210, 220 receive portions of different optical fibers 116 to accommodate the different vertical and/or lateral end positions of optical fibers 116. More particularly, cover 200 may include a first member 202 having a first face 204 defining a first seat 210 therein having a first height H1 (FIG. 17) to receive a portion of first optical fiber 116A. First face 204 may also define a second seat 220 therein having a second, different height H2 (FIG. 17) than first height H1 (FIG. 17) to receive a portion of second optical fiber 116B. Heights H1, H2 can be measured from any common reference point, such as an outermost extent of first face 204. Seats 210, 220 make first face 204 non-planar. Seats 210, 220 can be any structure capable of holding a position of a respective optical fiber 116, e.g., a groove (see e.g., FIG. 16), surface (see e.g., FIG. 23), contour, etc. Seats 210, 220 can prevent movement of optical fibers 116 in a vertical and/or lateral direction. Cover 200 may include a second, planar face 230 opposing first face 204.

Figure 16:
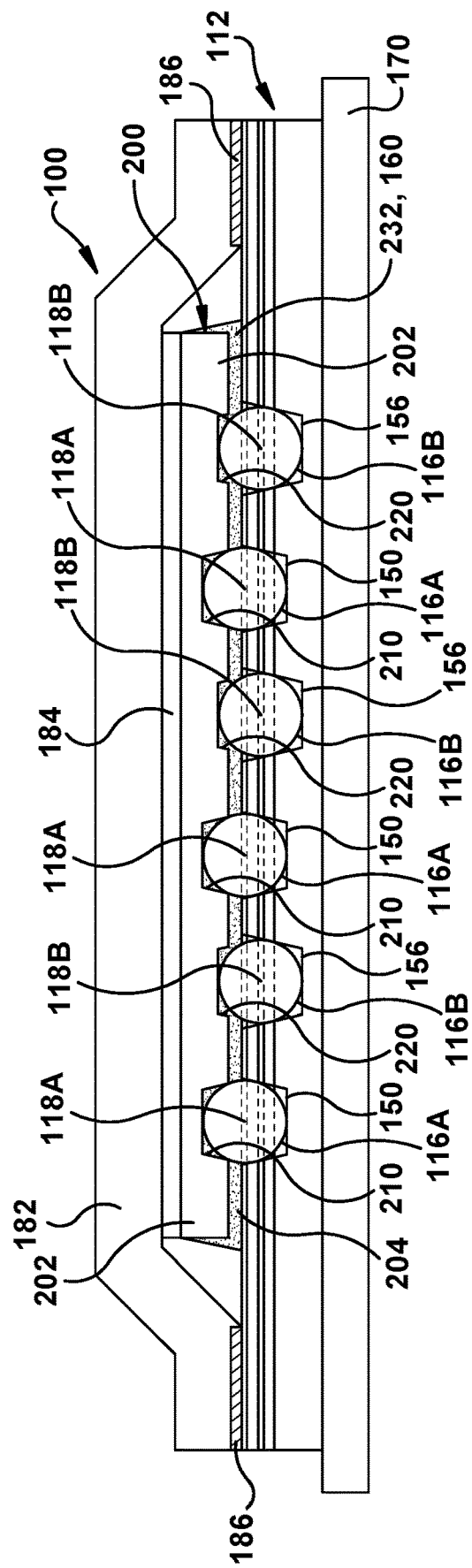
FIG. 16 shows a cross-sectional view of a PIC die and PIC package with a cover attached, according to embodiments of the disclosure.

As shown in FIG. 16, PIC package 100 may include PIC die 112 on packaging substrate 170, e.g., a printed circuit board, RDL interposer, etc. Cover 200 may be coupled over at least a portion of PIC die 112, i.e., over optical fibers 116 and/or other parts of PIC die 112, for example, by a fill material 232 such as an adhesive 160. Coupling cover 200 thus may include using fill material 232 between cover 200 and first optical fiber 116A and second optical fiber 116B. In this manner, PIC package 100 may include fill material 232 between cover 200 and first optical fiber 116A and second optical fiber 116B. PIC package 100 may also include any now known or later developed lid 182 over cover 200. Lid 182 may be coupled to cover 200 by, for example, thermal paste 184. Lid 182 may also couple to PIC die 112 by any appropriate adhesive 186. Lid 182 may optionally include a heat sink (not shown).

In one embodiment, cover 200 may be configured to accommodate optical fibers 116 in different vertical depth grooves 150, 156 only (see e.g., FIG. 16). In another embodiment shown in FIG. 18, cover 200 may accommodate optical fibers 116 in different vertical depth grooves 150, 156 and different lateral depth grooves 150, 156. In this latter case, cover 200 may include first member 204 including a first portion 240 (adjacent first seat 210) and facing ends of layers 130 adjacent first end face 180. First member 204 may also include a second portion 242 (adjacent second seat 220) and facing ends of layers 130 adjacent second end face 188. Portions 240, 242 may be parts of first member 204 that define seats 210, 220. Portions 240, 242 either contact or nearly contact layers 130 adjacent end faces 180, 188 of grooves 150, 156 in edge 137 of PIC die 112. Each portion 240, 242 may also fill a space (not filled by fill material 232) between one or more optical fibers 116 and end fac(es) 180, 188 or other parts of PIC die 112. The coupling of cover 200 may include positioning first portion 240 of first member 204 adjacent first seat 210 and facing layers 130 adjacent first end face 180 and positioning second portion 242 of first member 204 adjacent second seat 220 and facing layers 130 adjacent second end face 188. Portions 240, 242 thus hold cover 200 and optical fibers 116 relative to end faces 180, 188 where different lateral depth (LD1-LDn) grooves 150, 156 are employed. In another embodiment shown in FIG. 19, cover 200 may be configured to accommodate only different lateral depth grooves 150, 156.

Figure 17:
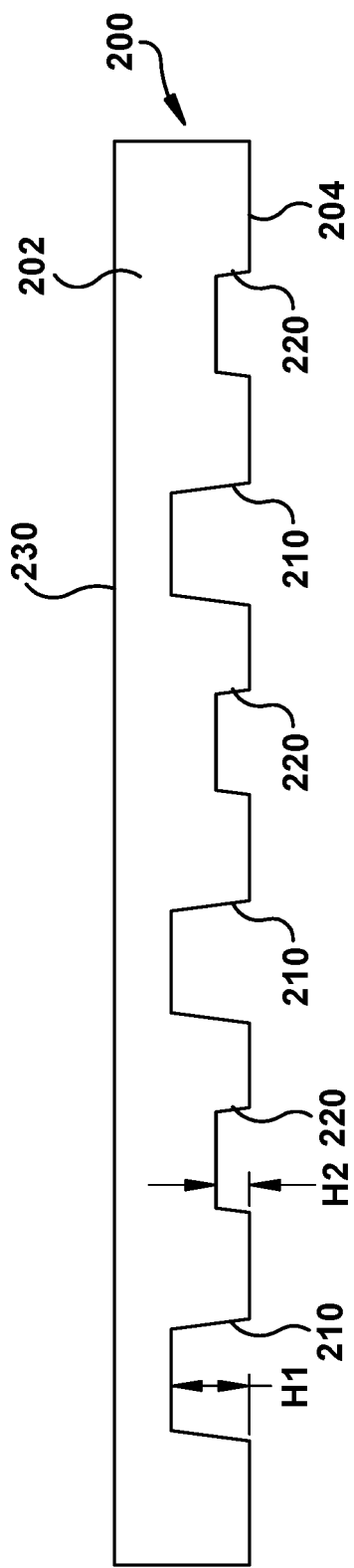
FIG. 17 shows a cross-sectional view of a cover for a PIC die and PIC package, according to embodiments of the disclosure.

Cover 200 can be made of any material typically used for covers of optical fibers 116 in a PIC package 100 such as but not limited to glass, polymer, wood, plastic, and metal. In FIG. 17, cover 200 includes only first member 204, thus it is a single material such as glass. In another example, shown in FIGS. 18-20, cover 200 may include two members: first member 204 of a first material, and a second member 206 operatively coupled to first member 204. Second member 204 may include a second, different material. In this case, first member 204 may include a first material of, for example, a rigid material such as a polymer or plastic, and second member 204 may include a second, different material such as glass. Other combinations of materials for members 204, 206 are also possible. Materials may be selected for their ease of manufacture, thermal conductivity, structural parameters, among other factors. Where cover 200 includes two members, second, planar face 230 is on member 206, i.e., the uppermost member of cover 200. First member 204 may be coupled to second member 206 by any appropriate mechanism, e.g., adhesive, fastener(s), mating couplings, among other options.

Figure 18:
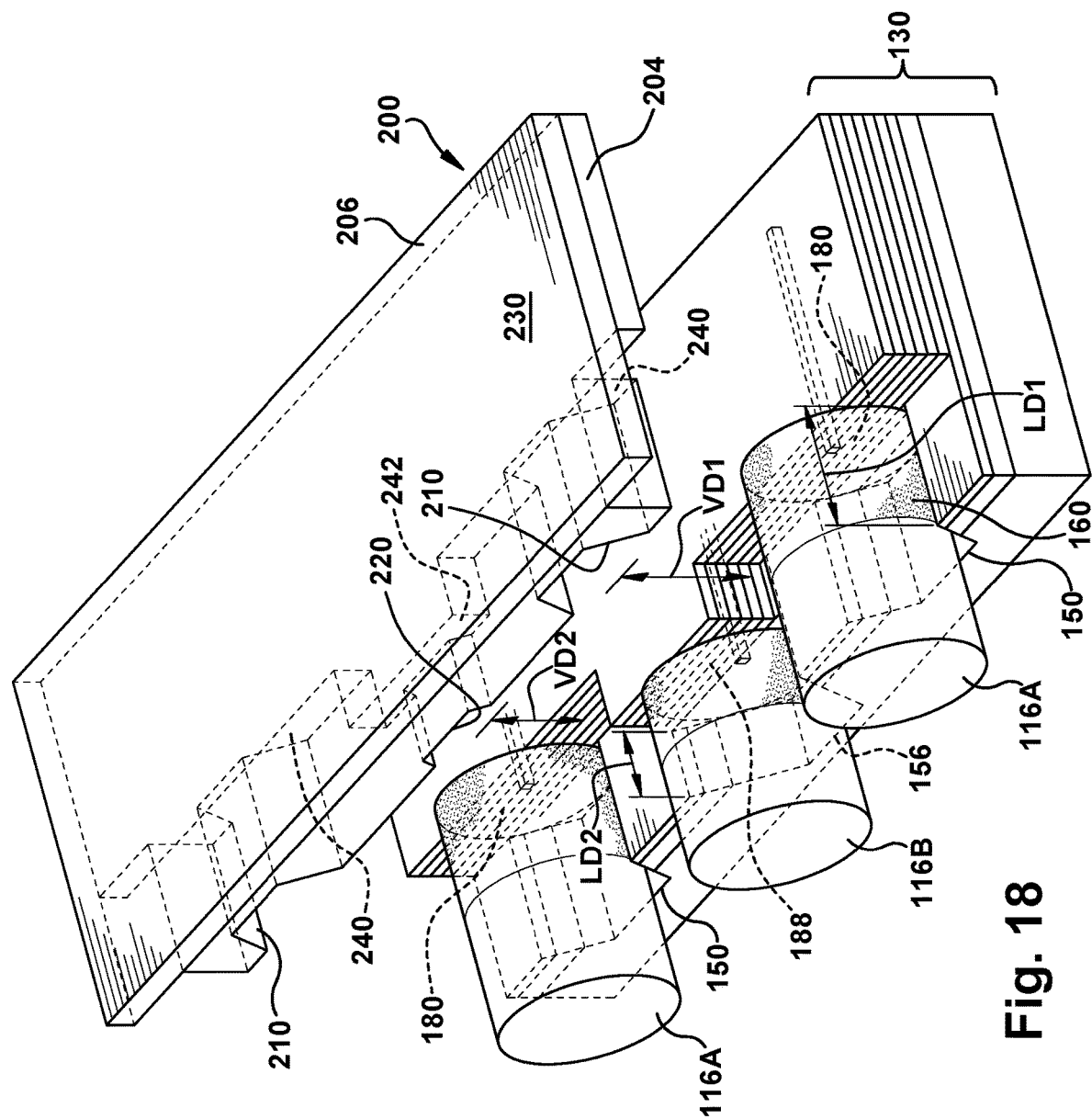
FIG. 18 shows an expanded perspective view of a PIC die and PIC package with a cover unattached, according to other embodiments of the disclosure.
Figure 19:
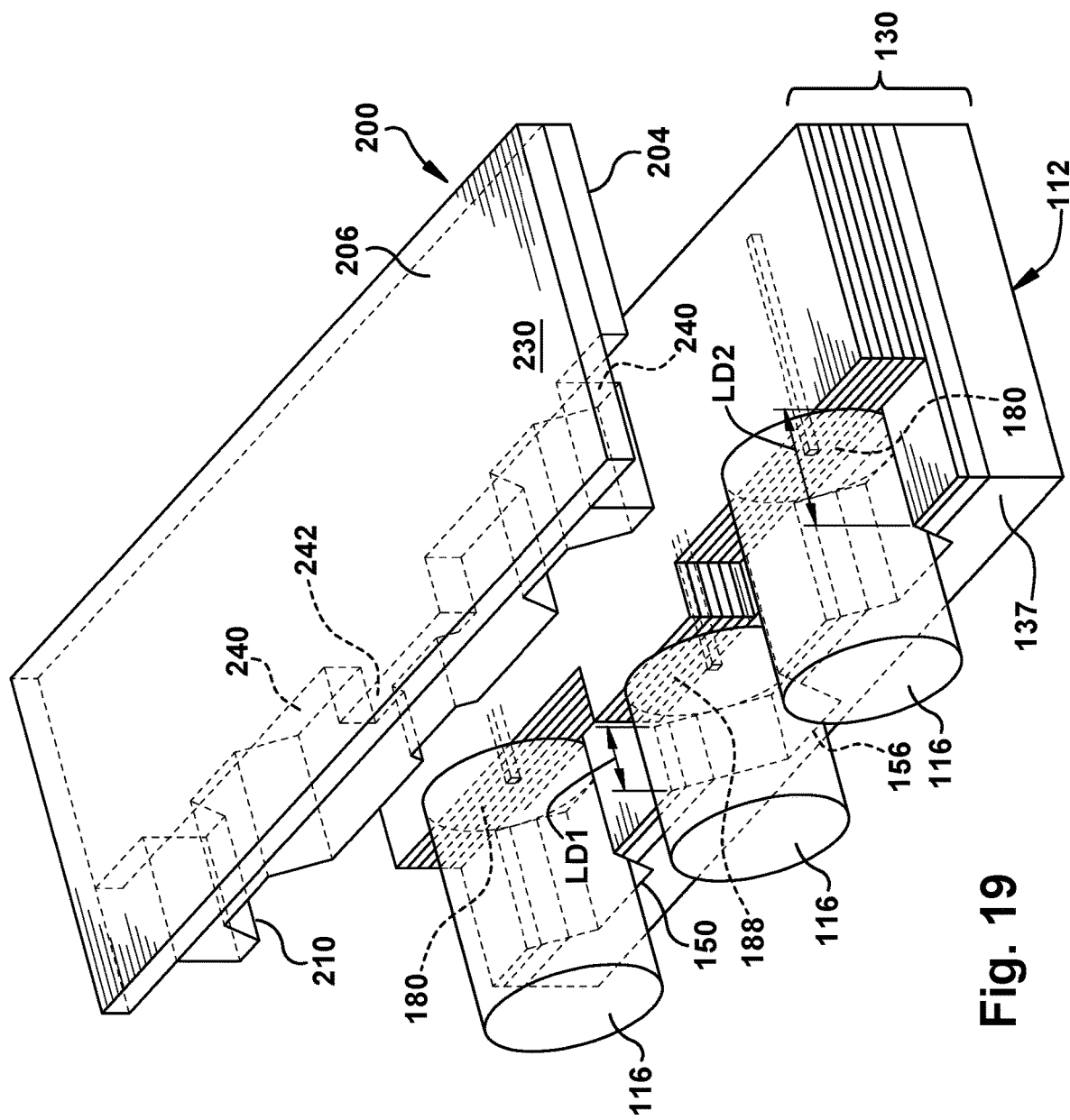
FIG. 19 shows an expanded perspective view of a PIC die and PIC package with a cover unattached, according to additional embodiments of the disclosure.
Figure 20:
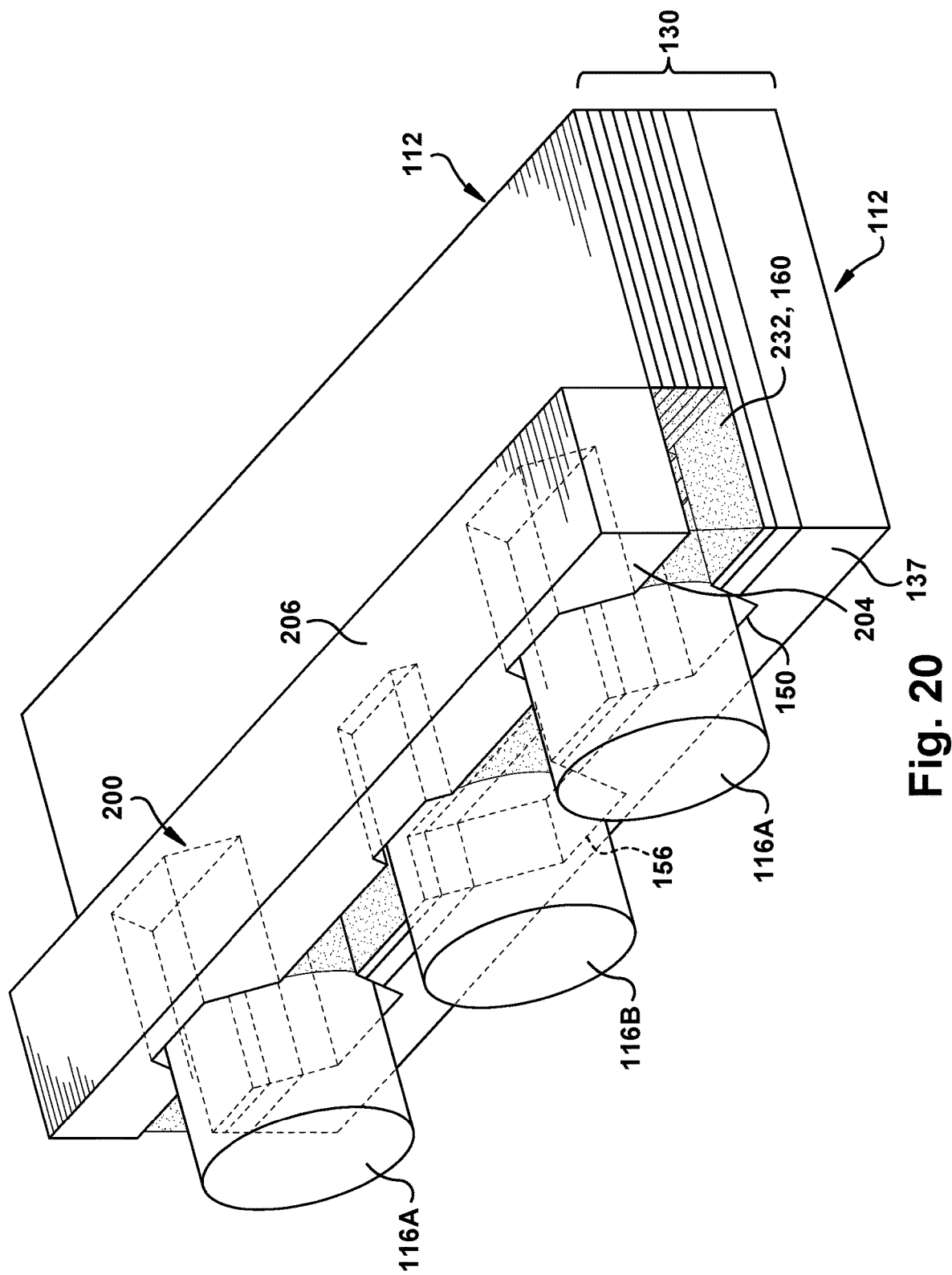
FIG. 20 shows a perspective view of a cover covering only a portion of a PIC die and PIC package, according to embodiments of the disclosure.

As shown in FIGS. 12 and 13, cover 200 may cover only a portion of PIC die 112 (FIG. 12), or cover 200 may cover an entirety of PIC die 112 (FIG. 13). FIGS. 18 and 19 also show cover 200 covering an entirety of PIC die 112, and FIG. 20 shows a perspective view of a cover 200 covering only a portion of PIC die 112.

Figure 21:
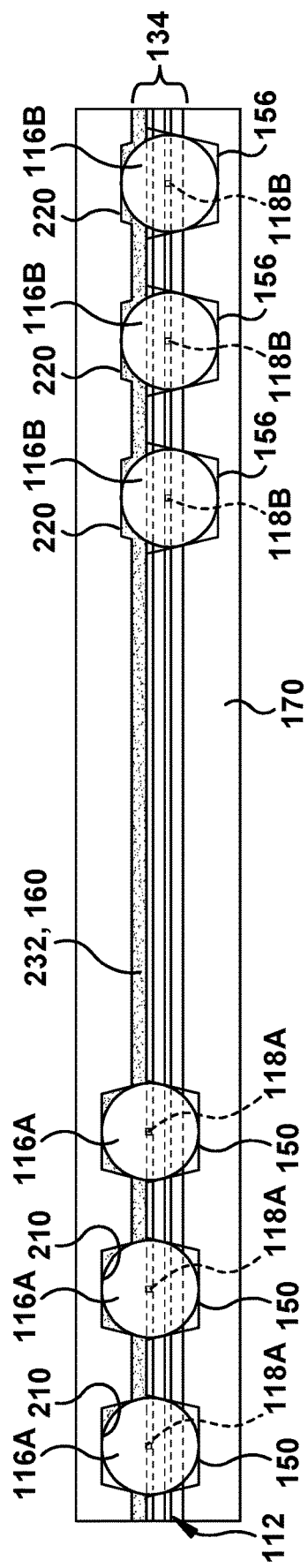
FIG. 21 shows a cross-sectional view of a PIC die and PIC package with a cover attached, according to embodiments of the disclosure.

FIG. 21 shows cover 200 applied to the FIG. 10 embodiment. In FIG. 21, first grooves 150 are together in one location on body 128, while second grooves 156 are together in another location on body 128. Hence, optical fibers 116 having cores at certain vertical depths and/or certain lateral depths can be located together. In this setting, cover 200 with different height seats 210, 220 may be used as part of PIC package 100 to cover optical fibers 116A, 116B. Cover 200 holds optical fibers 116A, 116B in place regardless of the location of the different types of grooves 150, 156.

Figure 22:
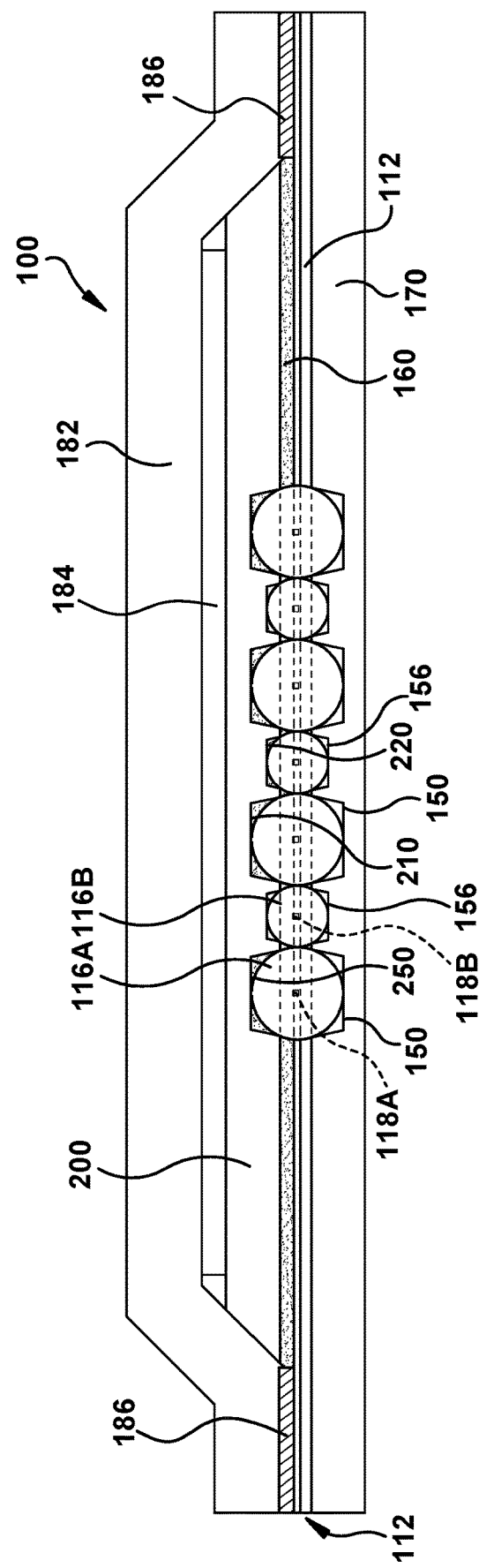
FIG. 22 shows a cross-sectional view of a PIC die and PIC package with a cover attached, according to other embodiments of the disclosure.

FIG. 22 shows another embodiment in which PIC package 100 includes optical fibers 116A, 116B of different diameters and in grooves 150, 156 of different vertical depths (and widths). Cover 200 includes seats 210, 220 to receive respective portions of optical fibers 116A, 116B, and hold them in place.

Figure 23:
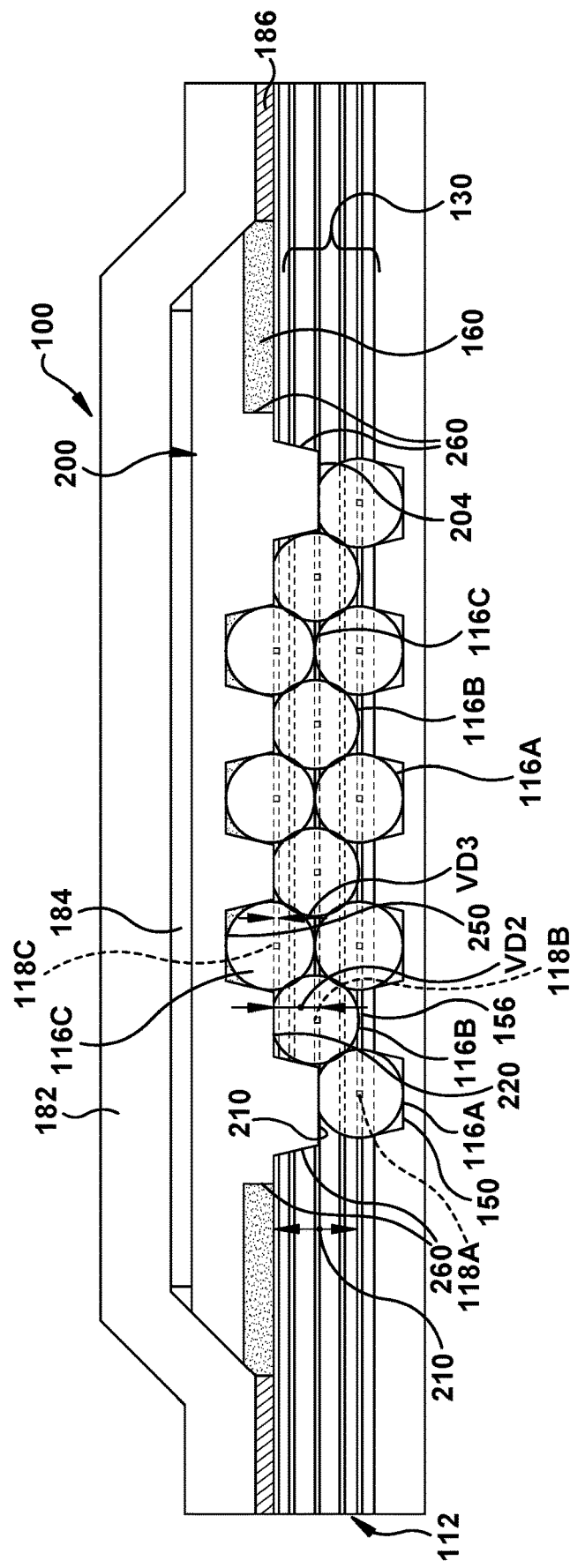
FIG. 23 shows a cross-sectional view of a PIC die and PIC package with a cover attached, according to more embodiments of the disclosure.

FIG. 23 shows a cross-sectional view of an embodiment of PIC package 100 that includes stacked rows of optical fibers 116A-C at different vertical depths VD1-VD3 (could also be at different lateral depths LD1-LD3 from edge 137 of body 128). Only a lower row of optical fibers 116A is positioned in grooves 150, while a middle row of optical fibers 116B is supported from below by optical fibers 116A, and an upper row of optical fibers 116C is supported from below by optical fibers 116B. Here, cover 200 includes three different seats 210, 220 and 250 to engage with exposed upper portions of optical fibers 116A-C. Seat 250 includes a groove in first face 204 of first member 204 for optical fibers 116C, but seats 210, 220 may need only be surfaces, or steps in first face 204, to hold optical fibers 116A-B in position due to the stacked nature of the optical fibers. Hence, where stacked rows of optical fibers 116A-C are used, it will be recognized that other optical fibers 116 may hold certain other optical fibers 116 in place rather than grooves 150, 156 in edge 137 of PIC 112. Further, seats 210, 220, 250 may hold other optical fibers 116 in place from above.

In any of the embodiments descried herein, cover 200 may have any thickness required to provide the necessary seating for optical fibers 116A-C. Any number of different height and/or different lateral extent seats 210, 220, 250 can be employed with PIC package 110 and cover 200. The seats can be arranged to hold the position of individual optical fibers 116, rows of optical fibers 116, and/or stacked rows of optical fibers 116. In addition, as shown in FIG. 23, any additional structure necessary to position cover 200 beyond fill material 232 may be employed, such as but not limited to lateral outer surfaces 260 of cover 200 shaped to mate with openings in interconnect layers 134. Other structures are also possible.

Embodiments of the disclosure provide direct optical signal alignment and communication to individual layers of interest in a PIC die and reduce signal losses and cross-talk. The PIC die also provides better use of discrete layers, e.g., by freeing up areas of an active layer for other active layer devices rather than fiber attach structure. The PIC die also provides higher data transmission rates and higher data transmission density in and out of individual layers, e.g., with a coupling efficiency of greater than two decibels. The set of grooves provides flexibility to direct light to one or more active layers (front end of line FEOL) optical components, and/or to optical components in the back-end-of line (BEOL) and/or middle-of-line (MOL) interconnect layers. The set of grooves also provides flexibility to direct light to one or more optical components located at different lateral depths relative to an edge of the body of the PID die. Vertical waveguides may be used to transmit the optical signal vertically between various layers, allowing input of an optical signal at one layer but use of the optical signal at another layer. Embodiments of the disclosure can also enable the creation, construction, and integration of three-dimensional (3D) integrated circuit photonic dies. The cover including various arrangement of seats for portions of the optical fibers ensures the fibers do not move.

The methods as described above are used in the fabrication of photonic integrated circuit dies. The resulting PIC dies can be distributed by the fabricator in raw wafer form (that is, as a single wafer that has multiple unpackaged chips), as a bare die, or in a packaged form. In the latter case the PIC die is mounted in a single PIC package (such as a plastic carrier, with leads that are affixed to a motherboard or other higher level carrier) or in a multichip PIC package (such as a ceramic carrier that has either or both surface interconnections or buried interconnections). In any case the die is then integrated with other chips, discrete circuit elements, and/or other signal processing devices as part of either (a) an intermediate product, such as a motherboard, or (b) an end product. The end product can be any product that includes PIC dies, ranging from toys and other low-end applications to advanced computer products having a display, a keyboard or other input device, and a central processor.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A photonic integrated circuit (PIC) die package, comprising:
    a PIC die including:
        a body having a plurality of layers including a plurality of interconnect layers;
        a first optical fiber positioned in a first groove in an edge of the body, the first optical fiber aligned with a first optical component in a first layer of the body at a first vertical depth in the plurality of layers; and
        a second optical fiber positioned in a second groove in the edge of the body, the second optical fiber aligned with a second optical component in a second, different layer of the body at a second different vertical depth than the first vertical depth of the plurality of layers; and
    a cover over at least a portion of the body, the cover including a first member having a first face defining a first seat therein having a first height to receive a portion of the first optical fiber and defining a second seat therein having a second, different height than the first height to receive a portion of the second optical fiber.

2. The PIC die package of claim 1, further comprising a fill material between the cover and the first optical fiber and the second optical fiber.

3. The PIC die package of claim 1, further comprising a lid over the cover.

4. The PIC die package of claim 1, wherein the first groove has a first end face exposing the first optical component at a first lateral depth from the edge of the body, and the second groove has a second end face exposing the second optical component at a second, different lateral depth from the edge of the body than the first lateral depth, and
    wherein the first member includes a first portion adjacent the first seat facing the plurality of layers adjacent the first end face and a second portion adjacent the second seat facing the plurality of layers adjacent the second end face.

5. The PIC die package of claim 1, wherein the cover further includes a second, planar face opposing the first face.

6. The PIC die package of claim 5, wherein the cover further includes a second member operatively coupled to the first member, wherein the second, planar face is on the second member.

7. The PIC die package of claim 1, wherein the cover covers an entirety of the PIC die.

8. A photonic integrate circuit (PIC) die package, comprising:
    a PIC die including:
        a body having a plurality of layers including a plurality of interconnect layers; and
        a first optical fiber positioned in a first groove in an edge of the body, the first groove aligning a core of the first optical fiber with a first optical component in the plurality of layers, the first groove having a first end face exposing the first optical component at a first lateral depth from an edge of the body, and
        a second optical fiber positioned in a second groove in the edge of the body, the second groove aligning a core of the second optical fiber with a second optical component in the plurality of layers, the second groove having a second end face exposing the second optical component at a second, different lateral depth from the edge of the body than the first lateral depth; and
    a cover over at least a portion of the PIC die, the cover including a first member having a first portion facing the plurality of layers adjacent the first end face and a second portion facing the plurality of layers adjacent the second end face.

9. The PIC die package of claim 8, wherein the first groove aligns the core of the first optical fiber positioned therein with the first optical component in a first layer at a first vertical depth in the plurality of layers; and
    the second groove aligns the core of the second optical fiber positioned therein with the second optical component in a second, different layer at a second, different vertical depth than the first vertical depth of the first layer, and
    wherein the first member of the cover has a first face defining a first seat therein having a first height to receive a portion of the first optical fiber and defining a second seat therein having a second, different height than the first height to receive a portion of the second optical fiber.

10. The PIC die package of claim 9, wherein the first portion of the first member is adjacent the first seat, and the second portion of the first member is adjacent the second seat.

11. The PIC die package of claim 9, wherein the cover further includes a second, planar face opposing the first face.

12. The PIC die package of claim 11, wherein the cover further includes a second member operatively coupled to the first member, wherein the second, planar face is on the second member.

13. The PIC die package of claim 8, further comprising a fill material between the cover and the first optical fiber and the second optical fiber.

14. The PIC die package of claim 8, further comprising a lid over the cover.

15. The PIC die package of claim 8, wherein the cover covers an entirety of the PIC die.

16. A method, comprising:
coupling a first optical fiber into a first groove defined in an edge of a body of a photonic integrated circuit (PIC) die, the first groove aligning a core of the first optical fiber with a first optical component in a first layer at a first vertical depth in a plurality of layers of the body;
coupling a second optical fiber in a second groove defined in the edge of the body, the second groove aligning a core of the second optical fiber with a second optical component in a second, different layer at a second, different vertical depth in the plurality of layers of the body; and
coupling a cover over at least a portion of the PIC die, the cover including a first member having a first face defining a first seat therein having a first height to receive a portion of the first optical fiber and defining a second seat therein having a second, different height than the first height to receive a portion of the second optical fiber.

17. The method of claim 16, wherein coupling the cover includes using a fill material between the cover and the first optical fiber and the second optical fiber.

18. The method of claim 16, further comprising coupling a lid over the cover.

19. The method of claim 16, wherein the first groove has a first end face exposing the first optical component at a first lateral depth from the edge of the body, and the second groove has a second end face exposing the second optical component at a second, different lateral depth from the edge of the body than the first lateral depth, and
wherein coupling the cover includes positioning a first portion of the first member adjacent the first seat facing the plurality of layers adjacent the first end face, and positioning a second portion of the first member adjacent the second seat facing the plurality of layers adjacent the second end face.

20. The method of claim 16, wherein coupling the cover includes coupling the cover to cover an entirety of the PIC die.

\* \* \* \* \*